US 7,754,626 B2

(12) United States Patent
Baron et al.

(10) Patent No.: US 7,754,626 B2
(45) Date of Patent: Jul. 13, 2010

(54) ARTICLE OF APPAREL INCORPORATING A MODIFIABLE TEXTILE STRUCTURE

(75) Inventors: Michael Robert Baron, Tigard, OR (US); Karin Elizabeth Carter, Portland, OR (US); Bhupesh Dua, Portland, OR (US)

(73) Assignee: Nike, Inc., Beaverton, OR (US)

( * ) Notice: Subject to any disclaimer, the term of this patent is extended or adjusted under 35 U.S.C. 154(b) by 935 days.

(21) Appl. No.: 11/053,120

(22) Filed: Feb. 7, 2005

(65) Prior Publication Data

US 2005/0208860 A1    Sep. 22, 2005

Related U.S. Application Data

(63) Continuation of application No. 10/967,635, filed on Oct. 19, 2004, now abandoned, which is a continuation-in-part of application No. 10/805,681, filed on Mar. 19, 2004, now abandoned.

(51) Int. Cl.
*B32B 5/00*    (2006.01)
*B32B 7/00*    (2006.01)

(52) U.S. Cl. .................. 442/304; 442/181; 442/327

(58) Field of Classification Search ................ 442/181, 442/304, 327
See application file for complete search history.

(56) References Cited

U.S. PATENT DOCUMENTS

| | | | |
|---|---|---|---|
| 3,265,529 A | 8/1966 | Caldwell et al. | |
| 3,607,591 A | 9/1971 | Hansen | |
| 3,737,368 A * | 6/1973 | Such et al. | 428/169 |
| 4,267,710 A | 5/1981 | Imamichi | |
| 4,275,105 A * | 6/1981 | Boyd et al. | 428/198 |
| 4,351,874 A | 9/1982 | Kirby | |
| 4,392,258 A | 7/1983 | O'Neill | |
| 4,418,524 A | 12/1983 | Ito et al. | |
| 4,541,426 A | 9/1985 | Webster et al. | |
| 4,638,648 A | 1/1987 | Gajjar | |
| 5,095,548 A | 3/1992 | Chesebro, Jr. | |

(Continued)

FOREIGN PATENT DOCUMENTS

DE    196 19 858    11/1997

(Continued)

OTHER PUBLICATIONS

JP 2002180342A Published Jun. 26, 2009. English Abstract.*

(Continued)

*Primary Examiner*—Jenna-Leigh Johnson
(74) *Attorney, Agent, or Firm*—Plumsea Law Group, LLC

(57) ABSTRACT

An article of apparel is disclosed that includes a textile with at least one property that changes upon exposure to a physical stimulus. The textile has a modifiable structure formed from one or more yarns that exhibit a dimensional transformation upon exposure to the physical stimulus. The yarns have a first set of dimensions when unexposed to the physical stimulus, and the yarns have a second set of dimensions when exposed to the physical stimulus. The structure of the textile is modified by exposing the textile to the physical stimulus such that the yarns transform from the first set of dimensions to the second set of dimensions and change the property of the textile. Reinforcing structures, incisions, partial incisions, and coatings may also be utilized to enhance the textile structures.

5 Claims, 27 Drawing Sheets

U.S. PATENT DOCUMENTS

| | | | |
|---|---|---|---|
| 5,192,600 | A | 3/1993 | Pontrelli et al. |
| 5,367,710 | A | 11/1994 | Karmin |
| 5,645,924 | A | 7/1997 | Hamilton |
| 5,683,794 | A | 11/1997 | Wadsworth et al. |
| 5,834,093 | A | 11/1998 | Challis et al. |
| 5,868,724 | A * | 2/1999 | Dierckes et al. ............ 604/368 |
| 5,887,276 | A | 3/1999 | Lee |
| 5,908,673 | A | 6/1999 | Muhlberger |
| 6,253,582 | B1 | 7/2001 | Driggars |
| 6,319,558 | B1 | 11/2001 | Willemsen |
| 8,787,850 | | 7/2004 | Tebbe |
| 2006/0223400 | A1 | 10/2006 | Yasui et al. |

FOREIGN PATENT DOCUMENTS

| | | |
|---|---|---|
| EP | 1 050 323 | 11/2000 |
| GB | 2254044 | 9/1992 |
| GB | 2333724 | 7/2002 |
| JP | 60-252746 | 12/1985 |
| JP | 60-252756 | 12/1985 |
| JP | 62-162043 | 7/1987 |
| JP | 2003-41462 | 2/2003 |
| JP | 2004-360094 | 12/2004 |
| JP | 2005-36374 | 2/2005 |
| WO | WO 92/16434 | 10/1992 |
| WO | WO 99/05926 | 2/1999 |
| WO | 2004/113599 A1 | 12/2004 |
| WO | 2004/113601 A1 | 12/2004 |
| WO | 2005/010258 A1 | 2/2005 |
| WO | 2005/038112 A1 | 4/2005 |
| WO | 2006/041200 A1 | 4/2006 |
| WO | 2006/043677 A1 | 4/2006 |
| WO | 2006/090808 A1 | 8/2006 |

OTHER PUBLICATIONS

JP 2002180342A Published Jun. 26, 2009. English Translation.*

Mitsubishi rayon: Changeable fiber stretches with moisture; Asian Textile Business; Sep. 1, 2003.
Office Action mailed Apr. 20, 2005 for U.S. Appl. No. 10/805,681.
Office Action mailed Nov. 14, 2005 for U.S. Appl. No. 10/805,681.
Office Action mailed May 5, 2006 for U.S. Appl. No. 10/805,681.
Office Action mailed Oct. 13, 2006 for U.S. Appl. No. 10/805,681.
Office Action mailed Jan. 16, 2007 for U.S. Appl. No. 10/805,681.
Office Action mailed Oct. 16, 2007 for U.S. Appl. No. 10/805,681.
Office Action mailed Feb. 7, 2007 for U.S. Appl. No. 10/967,635.
Office Action mailed May 4, 2007 for U.S. Appl. No. 10/967,635.
Office Action mailed Aug. 20, 2007 for U.S. Appl. No. 10/967,635.
Office Action mailed Mar. 31, 2008 for U.S. Appl. No. 10/967,635.
Office Action mailed Sep. 12, 2007 for U.S. Appl. No. 11/040,165.
Office Action mailed Nov. 26, 2007 for U.S. Appl. No. 11/040,165.
Office Action mailed Apr. 7, 2008 for U.S. Appl. No. 11/040,165.
Notice of Allowance mailed Jun. 13, 2008 for U.S. Appl. No. 11/040,165.
Office Action mailed Apr. 9, 2007 for U.S. Appl. No. 11/053,705.
Office Action mailed Jul. 1, 2008 for U.S. Appl. No. 11/053,705.
Office Action mailed Apr. 9, 2007 for U.S. Appl. No. 11/053,074.
Office Action mailed Jun. 27, 2008 for U.S. Appl. No. 11/053,074.
Office Action mailed Apr. 9, 2007 for U.S. Appl. No. 11/053,120.
Office Action mailed Jul. 1, 2008 for U.S. Appl. No. 11/053,120.
Office Action mailed Aug. 10, 2005 for U.S. Appl. No. 11/052,996.
Office Action mailed Jan. 25, 2006 for U.S. Appl. No. 11/052,996.
Office Action mailed May 18, 2006 for U.S. Appl. No. 11/052,996.
Office Action mailed Nov. 2, 2006 for U.S. Appl. No. 11/052,996.
Office Action mailed Jun. 27, 2007 for U.S. Appl. No. 11/052,996.
Office Action mailed Dec. 11, 2007 for U.S. Appl. No. 11/052,996.
Office Action mailed May 15, 2008 for U.S. Appl. No. 11/052,996.
Office Action mailed Jun. 16, 2008 for U.S. Appl. No. 11/052,996.
International Search Report and Written Opinion mailed Jun. 6, 2005 for PCT/US2005/005191.
International Search Report and Written Opinion mailed Jan. 26, 2006 for PCT/US2005/035831.
Office Action mailed Sep. 25, 2008 for U.S. Appl. No. 11/053,120.
Office Action mailed Nov. 13, 2008 for U.S. Appl. No. 10/967,635.

* cited by examiner

ARTICLE OF APPAREL INCORPORATING A MODIFIABLE TEXTILE STRUCTURE

CROSS-REFERENCE TO RELATED APPLICATION

This non-provisional U.S. Patent Application is a continuation application of U.S. patent application Ser. No. 10/967,635, which was filed in the U.S. Patent and Trademark Office on Oct. 19, 2004, now abandoned, and entitled Article Of Apparel Incorporating A Modifiable Textile Structure. U.S. patent application Ser. No. 10/967,635 was, in turn, a continuation-in-part application of and claimed priority to U.S. patent application Ser. No. 10/805,681, which was filed in the U.S. Patent and Trademark Office on Mar. 19, 2004, now abandoned, and entitled Article Of Apparel Incorporating A Modifiable Textile Structure. Each of these prior U.S. Patent Applications are entirely incorporated herein by reference.

BACKGROUND OF THE INVENTION

1. Field of the Invention

The present invention relates to apparel. The invention concerns, more particularly, an article of apparel that incorporates a textile with a structure that changes or is otherwise modified by a physical stimulus, such as the presence of water or a temperature change, to modify a property of the textile. The invention has application, for example, to articles of apparel intended for use during athletic activities.

2. Description of Background Art

Articles of apparel designed for use during athletic activities generally exhibit characteristics that enhance the performance or comfort of an individual. For example, apparel may incorporate an elastic textile that provides a relatively tight fit, thereby imparting the individual with a lower profile that minimizes wind resistance. Apparel may also be formed from a textile that wicks moisture away from the individual in order to reduce the quantity of perspiration that accumulates adjacent to the skin. Furthermore, apparel may incorporate materials that are specifically selected for particular environmental conditions. Examples of various types of articles of apparel include shirts, headwear, coats, jackets, pants, underwear, gloves, socks, and footwear.

The characteristics of the textiles that are incorporated into apparel are generally selected based upon the specific activity for which the apparel is intended to be used. A textile that minimizes wind resistance, for example, may be suitable for activities where speed is a primary concern. Similarly, a textile that reduces the quantity of perspiration that accumulates adjacent to the skin may be most appropriate for athletic activities commonly associated with a relatively high degree of exertion. Accordingly, textiles may be selected to enhance the performance or comfort of individuals engaged in specific athletic activities.

Textiles may be defined as any manufacture from fibers, filaments, or yarns characterized by flexibility, fineness, and a high ratio of length to thickness. Textiles generally fall into two categories. The first category includes textiles produced directly from webs of fibers or filaments by bonding, fusing, or interlocking to construct non-woven fabrics and felts. The second category includes textiles formed through a mechanical manipulation of yarn, thereby producing a woven fabric.

Yarn is the raw material utilized to form textiles in the second category and may be defined as an assembly having a substantial length and relatively small cross-section that is formed from at least one filament or a plurality of fibers. Fibers have a relatively short length and require spinning or twisting processes to produce a yarn of suitable length for use in textiles. Common examples of fibers are cotton and wool. Filaments, however, have an indefinite length and may merely be combined with other filaments to produce a yarn suitable for use in textiles. Modern filaments include a plurality of synthetic materials such as rayon, nylon, polyester, and polyacrylic, with silk being the primary, naturally-occurring exception. Yarn may be formed from a single filament or a plurality of individual filaments grouped together. Yarn may also include separate filaments formed from different materials, or the yarn may include filaments that are each formed from two or more different materials. Similar concepts also apply to yarns formed from fibers. Accordingly, yarns may have a variety of configurations that generally conform to the definition provided above.

The various techniques for mechanically-manipulating yarn into a textile include interweaving, intertwining and twisting, and interlooping. Interweaving is the intersection of two yarns that cross and interweave at substantially right angles to each other. The yarns utilized in interweaving are conventionally referred to as warp and weft. Intertwining and twisting encompasses procedures such as braiding and knotting where yarns intertwine with each other to form a textile. Interlooping involves the formation of a plurality of columns of intermeshed loops, with knitting being the most common method of interlooping.

SUMMARY OF THE INVENTION

The present invention is an article of apparel that includes a textile with at least one property that changes upon exposure to a physical stimulus. The textile has a modifiable structure formed from yarns that exhibit a dimensional transformation upon exposure to the physical stimulus. The yarns have a first set of dimensions when unexposed to the physical stimulus, and the yarns have a second set of dimensions when exposed to the physical stimulus. The structure of the textile is modified by exposing the textile to the physical stimulus such that the yarns transform from the first set of dimensions to the second set of dimensions and change the property of the textile. The yarns may be formed from a material that exhibits the dimensional transformation upon exposure to water. Accordingly, the physical stimulus may be water. In some embodiments, the physical stimulus may also be a change in temperature of the textile, light, or moving air, for example.

The textile may be formed through an interweaving process wherein the yarns define openings in the textile. The openings exhibit a first area when the yarns are unexposed to the physical stimulus, and the openings exhibit a second area when the yarns are exposed to the physical stimulus. The area of the openings may determine, for example the permeability of the textile. Accordingly, when the first area is greater than the second area, the permeability of the textile is decreased upon exposure to the physical stimulus. Furthermore, when the first area is less than the second area, the permeability of the textile is increased upon exposure to the physical stimulus. In some embodiments, the yarns may exhibit an undulating configuration to increase the permeability upon exposure to the physical stimulus.

A substantial portion of the textile may be formed from the yarn. Alternately, a first portion of the yarns may exhibit the dimensional transformation upon exposure to the physical stimulus, and a second portion of the yarns may remain dimensionally-stable upon exposure to the physical stimulus.

The textile may also be formed through an interlooping process. In some embodiments, the yarns define openings in the textile. The openings may exhibit a first area when the yarns are unexposed to the physical stimulus, and the openings may exhibit a second area when the yarns are exposed to the physical stimulus, thereby affecting the permeability of the textile. In other embodiments, the structure of the textile may exhibit a first texture when the yarns are unexposed to the physical stimulus, and the structure of the textile may exhibit a second texture when the yarns are exposed to the physical stimulus. The first texture may be, for example, smoother than the second texture, and the second texture may include a plurality of nodes that extend outward from a surface of the textile.

The textiles formed in accordance with the present invention exhibit a structure that is modified by a physical stimulus in order to change the properties of the textile. These or other textile structures may be altered by, for example, bonding materials to a textile structure in order to impart stretch resistance, forming incisions or partial incisions in the textile structure, or applying coatings to block effects of the physical stimulus.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following material discloses a variety of textiles with structures that are modified by a physical stimulus in order to change the properties of the textiles or articles of apparel that incorporates the textiles. Following the discussion of a plurality of exemplar textile structures, various modes in which these or other textile structures may be altered to enhance or otherwise change the overall properties of the textile structures will be discussed.

I. Exemplar Textile Structures

Figure 1:
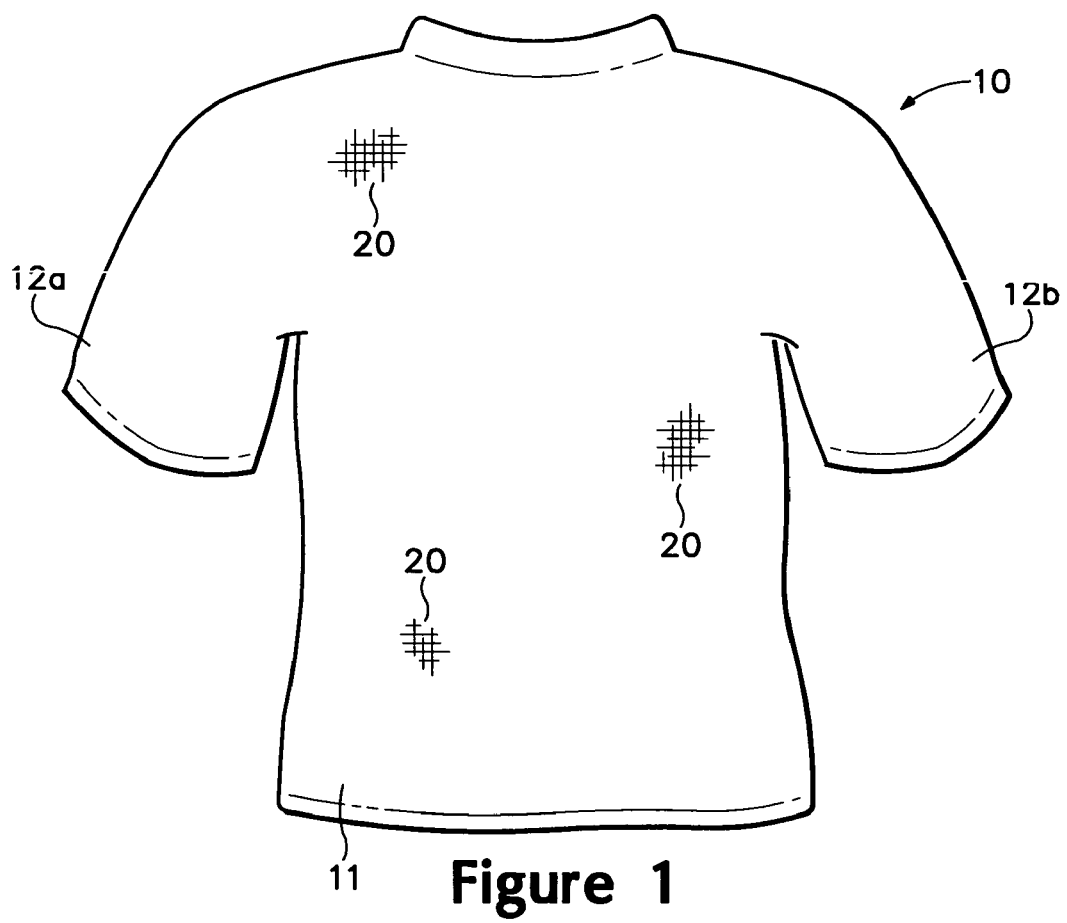
FIG. 1 is a plan view of an article of apparel incorporating a first textile structure in accordance with the present invention.

An article of apparel 10 is depicted in FIG. 1 as having the general configuration of a conventional short-sleeved shirt. One skilled in the relevant art will recognize, however, that the various textiles disclosed in the following material may be incorporated into articles of apparel exhibiting a variety of configurations, including long-sleeved shirts, headwear, coats, jackets, pants, underwear, gloves, socks, and footwear, for example. Accordingly, the various concepts disclosed in the following discussion and accompanying figures with respect to apparel 10 may be utilized in connection with a variety of apparel configurations.

The primary elements of apparel 10 include a torso portion 11 and two arm portions 12a and 12b. Torso portion 11 corresponds with a torso of an individual and, therefore, covers the torso when worn. Similarly, arm portions 12a and 12b respectively correspond with a right arm and a left arm of the individual and cover the arms when worn. Apparel 10 exhibits, therefore, the general configuration of a conventional long-sleeved shirt. In contrast with the conventional long-sleeved shirt, however, apparel 10 is at least partially formed from a textile with a structure that is modified by a physical stimulus, thereby changing properties of the textile. For example, the permeability or texture of the textiles may change when exposed to water, increased temperature, or moving air (i.e., wind). Accordingly, the structures of the textiles may be modified in order to provide apparel 10 with different properties. The following material discloses a variety of textiles with a structure that is modified by a physical stimulus in order to change the properties of the textile or apparel 10.

First Textile Structure

Figure 2:
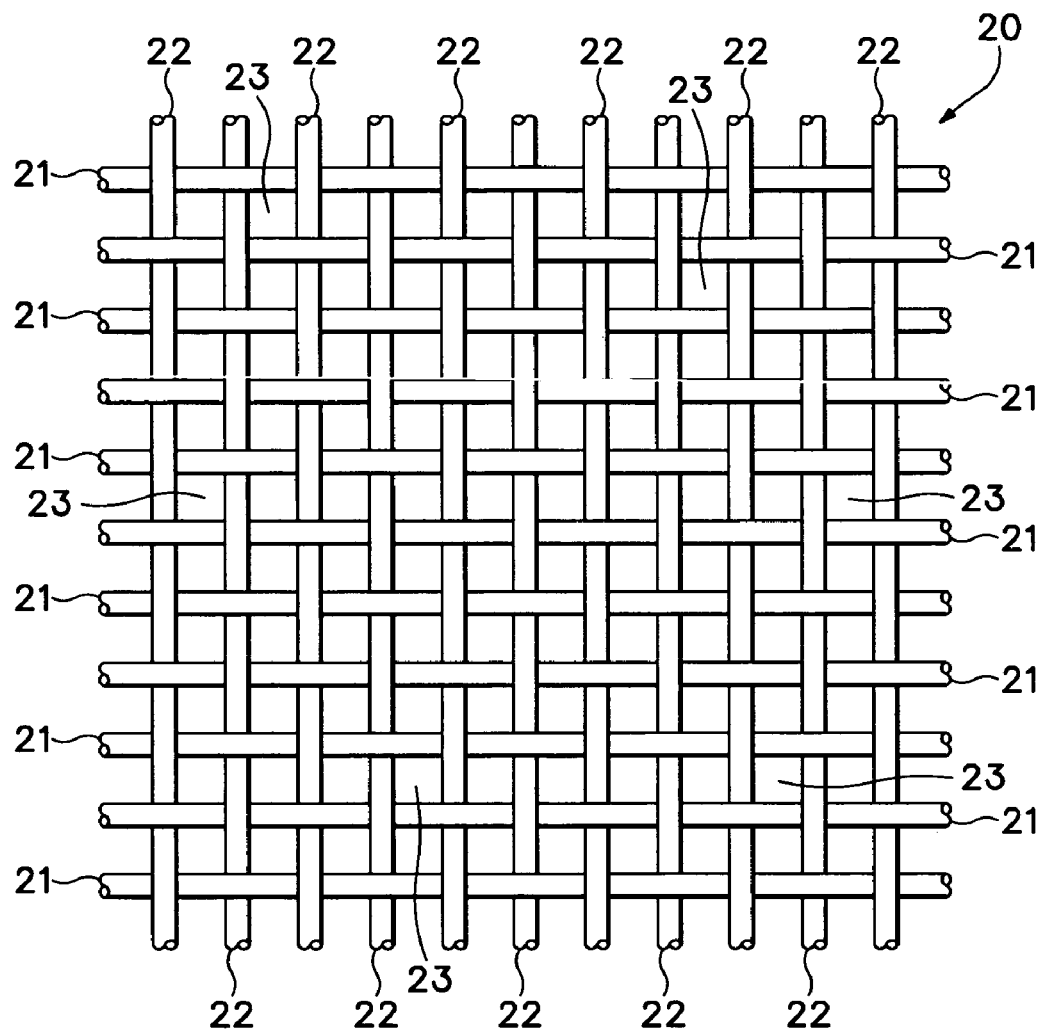
FIG. 2 is a plan view of a portion of the first textile structure in an unexposed state.
Figure 3:
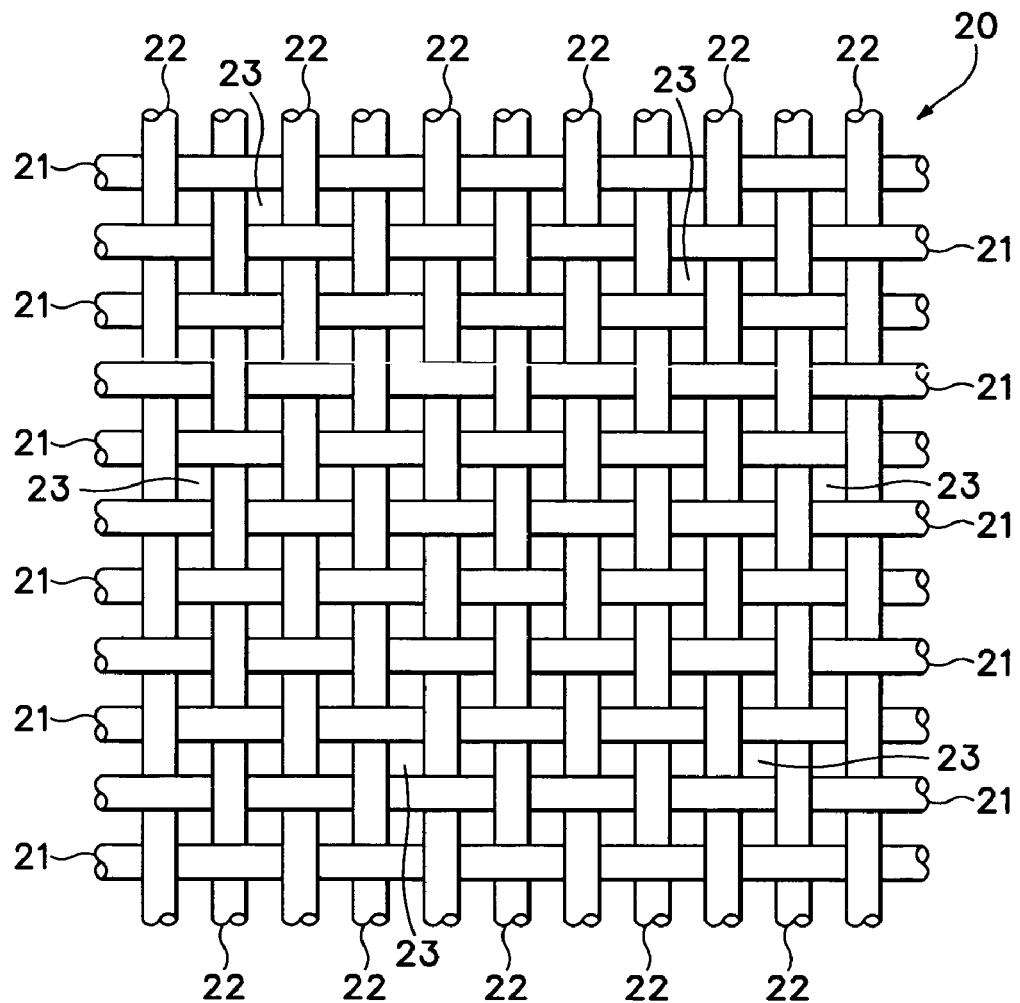
FIG. 3 is a plan view of the portion of the first textile structure in an exposed state.

A portion of a textile 20 that is suitable for apparel 10 is disclosed in FIGS. 2 and 3. Textile 20 has the structure of an interwoven material that includes a plurality of weft yarns 21 and a plurality of warp yarns 22. Textile 20 may be formed, therefore, by mechanically-manipulating yarns 21 and 22 thorough an interweaving process, which involves crossing and interweaving yarns 21 and 22 at substantially right angles to each other. The process of crossing and interweaving yarns 21 and 22 at substantially right angles to each other forms a plurality of discrete openings 23 that are located between the various yarns 21 and 22.

Each of yarns 21 and 22 are formed from one or more filaments or fibers that experience a dimensional transformation when exposed to a specific physical stimulus. In other words, the dimensions (i.e., length and thickness, for example) of yarns 21 and 22 change when textile 20 is in the presence of the physical stimulus. The dimensional transformation of yarns 21 and 22 has an effect upon the structure of textile 20. More particularly, the dimensional transformation of yarns 21 and 22 modifies the structure of textile 20, thereby changing the properties of textile 20. Accordingly, exposing textile 20 to the physical stimulus has the effect of changing the properties of textile 20, thereby changing the properties of apparel 10.

The manner in which exposing textile 20 to a physical stimulus has an effect upon the properties of textile 20 will now be discussed. With reference to FIG. 2, textile 20 is depicted in an unexposed state, in which yarns 21 and 22 are not exposed to the physical stimulus. With reference to FIG. 3, however, textile 20 is depicted in an exposed state, in which yarns 21 and 22 are exposed to the physical stimulus. In the unexposed state, yarns 21 and 22 exhibit dimensions with a relatively narrow thickness such that the area of each opening 23 is relatively large. In the exposed state, however, yarns 21 and 22 exhibit a greater thickness, which decreases the area of each opening 23. That is, exposing yarns 21 and 22 to the physical stimulus causes yarns 21 and 22 to increase in thickness, which decreases the area of each opening 23 and modifies the structure of textile 20.

The modification in the structure of textile 20 (i.e., decreasing the area of openings 23) changes the properties of textile 20. In the unexposed state, each opening 23 is relatively large. In the exposed state, however, the area of each opening 23 is decreased, which decreases the overall permeability of textile 20 to water, light, and moving air, for example. That is, the smaller area of each opening 23 in the exposed state decreases the ease with which water, light, and moving air may penetrate or otherwise extend through textile 20. Accordingly, exposing textile 20 to a physical stimulus changes the permeability properties of textile 20, thereby changing the permeability properties of apparel 10.

Various physical stimuli may induce a dimensional transformation of yarns 21 and 22, including the presence of water (whether in a liquid or gaseous state), increased temperature, or moving air, for example. With regard to water, many materials exhibit a tendency to absorb water and swell or otherwise transform dimensionally. The dimensional transformation may occur relatively rapidly due to immersion or contact with liquid water. In addition, the dimensional transformation may occur relatively slowly due to a prolonged exposure to air with a relative humidity that is greater than 75 percent, for example. Textile 20, and particularly yarns 21 and 22, may be formed from one or more of these materials that exhibit a tendency to transform dimensionally in the presence of a physical stimulus such as water. Furthermore, yarns 21 and 22 may be formed from materials that transform dimensionally due to temperature increases or moving air.

Yarns 21 and 22, as discussed above, may be formed from a variety of materials that transform dimensionally in the presence of water. For example, at least a portion of the filaments or fibers in yarns 21 and 22 may be formed of a moisture-absorptive polyester material, such as the various moisture-absorptive polyester materials manufactured by Tejin Fibers Limited of Japan. In some embodiments, yarns 21 and 22 may be a 75 denier, 72 filament semi-dull textured polyester yarn, and suitable formulations for the fiber or filament contents of yarns 21 and 22 include: (i) 70 percent generally non-absorptive polyester and 30 percent moisture-absorptive polyester; (ii) 76 percent generally non-absorptive polyester and 24 percent moisture-absorptive polyester; (iii) 80 percent generally non-absorptive polyester and 20 percent moisture-absorptive polyester; or (iv) 84 percent cationic-dyeable polyester that is also generally non-absorptive and 16 percent moisture-absorptive polyester. Accordingly, the percentage of the fibers or filaments formed from moisture-absorptive polyester may vary considerably within the scope of the present invention, and may also range from 5 percent to 100 percent in some embodiments. In each of the examples above, a non-absorptive or otherwise dimensionally-stable polyester fibers or filaments are combined with a moisture-absorptive polyester fibers or filaments. Other non-absorptive polymer fibers or filaments may also be utilized, such as rayon, nylon, and polyacrylic. In addition, silk, cotton, or wool may be utilized in yarns 21 and 22. Accordingly, a wide range of materials are suitable for the various yarns 21 and 22.

When incorporated into article of apparel 10, textile 20 may be utilized to protect or otherwise insulate the individual from specific environmental conditions. As discussed above, one physical stimulus that induces a dimensional transformation in yarns 21 and 22 is water, such as rain. When rain or another source of water (i.e., the physical stimulus) is not present, textile 20 is in the unexposed state and exhibits a relatively high permeability that permits air to freely enter and exit apparel 10, thereby cooling the individual. When significant quantities of water contact apparel 10, thereby placing textile 20 in the exposed state, textile 20 exhibits a relatively low permeability that inhibits the movement of water through textile 20. More specifically, water in the form of rain that contacts apparel 10 will cause openings 23 to decrease in area and limit the quantity of water that enters apparel 10. When yarns 21 and 22 are formed from a material that transforms dimensionally in the presence of heat, sunlight or other heat sources induce openings 23 to decrease in area and limit the quantity of solar radiation that enters apparel 10. In addition, moving air in the form of wind may induce openings 23 to decrease in area to limit the quantity of air that passes through apparel 10. Accordingly, forming textile 20 from yarns 21 and 22 that transform dimensionally in the presence of one or more physical stimuli may be utilized to effectively insulate the individual from specific environmental conditions, such as rain, sunlight, or wind.

Based upon the above discussion, textile 20 may be formed from various yarns 21 and 22 that transform dimensionally in the presence of a physical stimulus. The dimensional transformation of yarns 21 and 22 modify the structure of textile 20, thereby inducing a change in the properties of textile 20. When incorporated into apparel 10, the change in the properties of textile 20 when exposed to the physical stimulus may be utilized to insulate the individual from specific environmental conditions, such as rain, sunlight, or wind. Accordingly, textile 20 effectively adapts to changing environmental conditions in order to enhance the comfort of the individual wearing apparel 10.

Second Textile Structure

With respect to textile 20, both of yarns 21 and 22 are at least partially formed from materials that transform dimensionally in the presence of a physical stimulus. In some embodiments, however, various yarns may be entirely formed from a material that does not dimensionally-transform to a significant degree in the presence of a physical stimulus. That is, some of the yarns forming the textile of apparel 10 may be formed from a dimensionally-stable yarn that is not significantly affected by the physical stimulus.

Figure 4:
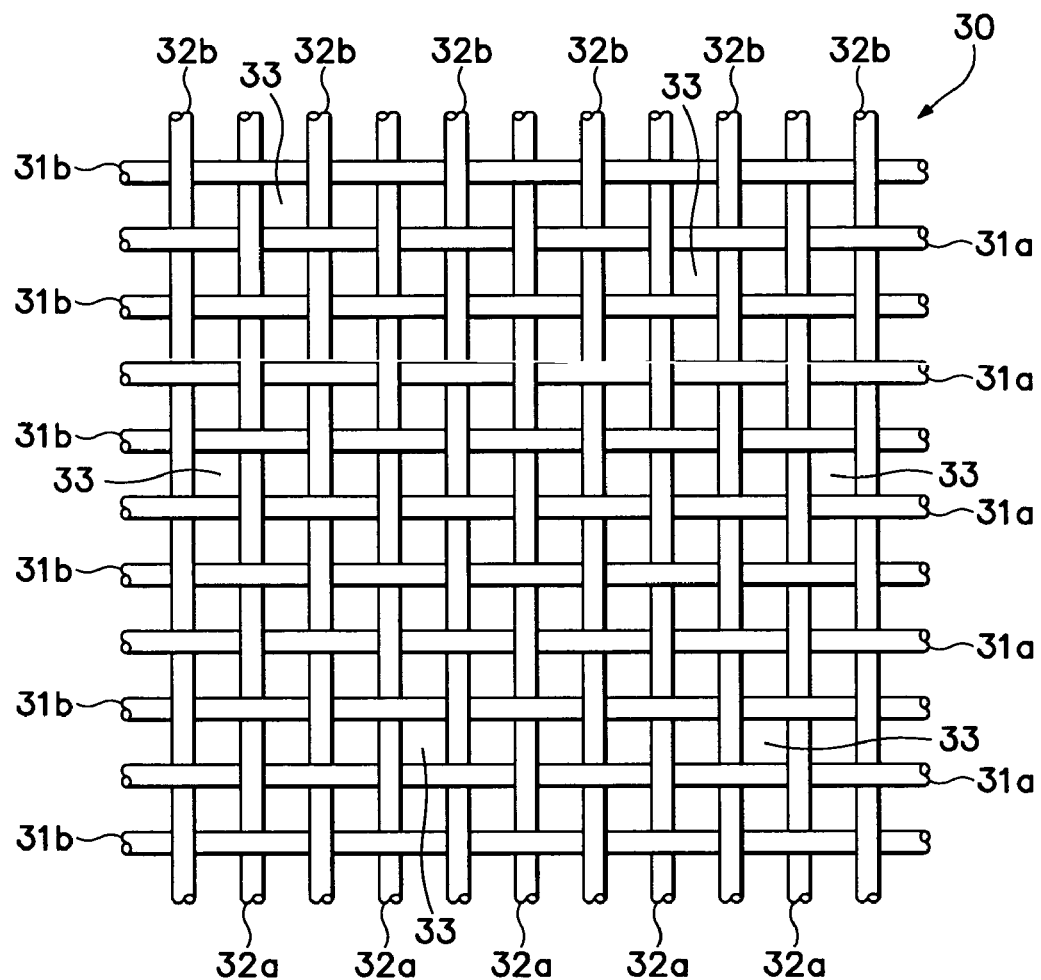
FIG. 4 is a plan view of a portion of a second textile structure in an unexposed state.
Figure 5:
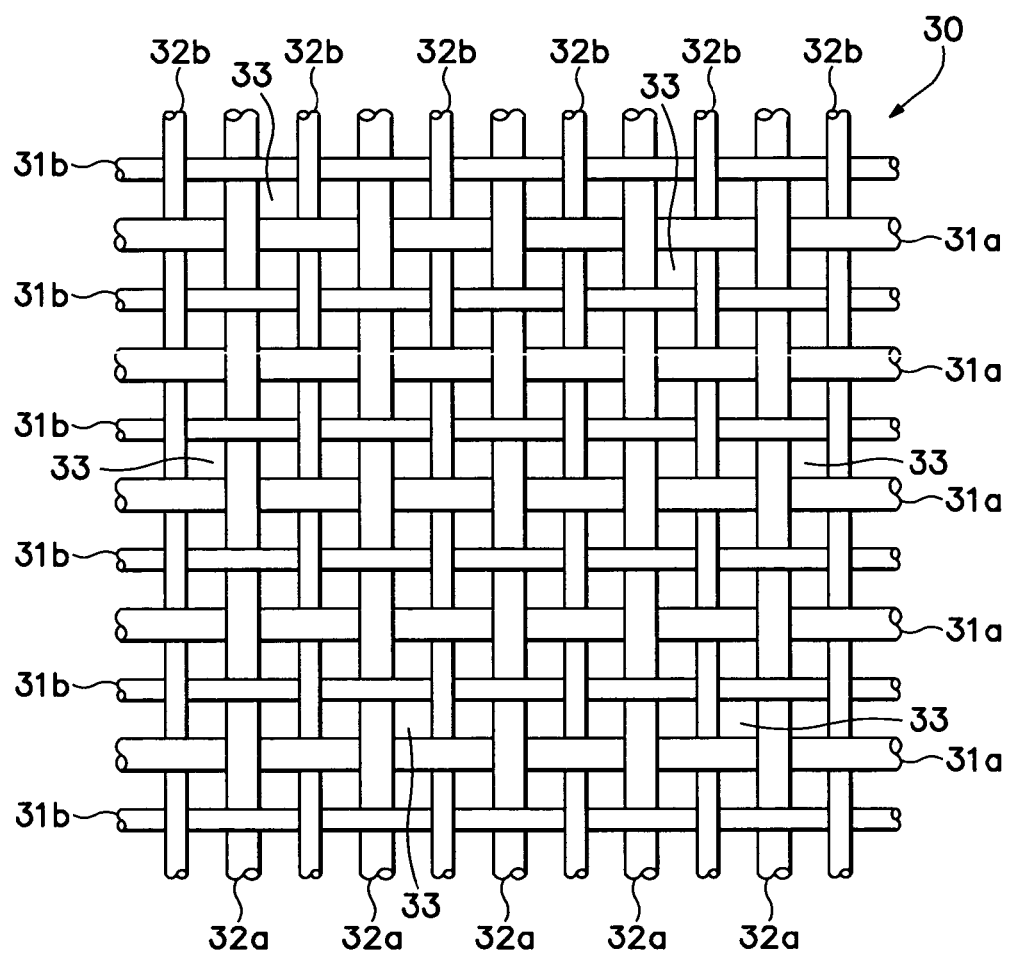
FIG. 5 is a plan view of the portion of the second textile structure in an exposed state.

A textile 30 is depicted in FIGS. 4 and 5 that includes a plurality of weft yarns 31a, a plurality of other weft yarns 31b, a plurality of warp yarns 32a, and a plurality of other warp yarns 32b that define various openings 33. Whereas yarns 31a and 32a are formed from a material that dimensionally-transforms in the presence of a physical stimulus, yarns 31b and 32b are formed from a dimensionally-stable yarn that is not significantly affected by the physical stimulus.

The manner in which exposing textile 30 to a physical stimulus has an effect upon the properties of textile 30 will now be discussed. With reference to FIG. 4, textile 30 is depicted in an unexposed state, in which yarns 31a, 31b, 32a, and 32b are not exposed to the physical stimulus. With reference to FIG. 5, however, textile 30 is depicted in an exposed state, in which yarns 31a, 31b, 32a, and 32b are exposed to the physical stimulus. In the unexposed state, each of yarns 31a, 31b, 32a, and 32b exhibit dimensions with a relatively narrow thickness such that the area of each opening 33 is relatively large. In the exposed state, however, yarns 31a and 32a exhibit a greater thickness, which decreases the area of each opening 33. That is, exposing yarns 31a and 32a to the physical stimulus causes yarns 31a and 32a to increase in thickness, which decreases the area of each opening 33 and modifies the structure of textile 30. As discussed above, yarns 31b and 32b are formed from a dimensionally-stable yarn that is not significantly affected by the physical stimulus. Accordingly, 31b and 32b do not transform dimensionally when exposed to the physical stimulus.

The modification in the structure of textile 30 (i.e., decreasing the area of openings 33) changes the properties of textile 30. In the unexposed state, each opening 33 is relatively large. In the exposed state, however, the area of each opening 33 is decreased, which decreases the overall permeability of textile 30 to water, light, and moving air, for example. That is, the smaller area of each opening 33 in the exposed state decreases the ease with which water, light, and moving air may penetrate through textile 30. Accordingly, exposing textile 30 to a physical stimulus changes the permeability properties of textile 30. Given that textile 30 may replace textile 20 in apparel 10, exposing textile 30 to a physical stimulus may be utilized to effectively change the permeability properties of apparel 10.

An advantage of forming yarns 31b and 32b from a dimensionally-stable yarn that is not significantly affected by the physical stimulus relates to the dimensional stability of textile 30. Yarns 31b and 32b form a web in textile 30 that does not significantly change dimensions when exposed to the physical stimulus. Whereas yarns 31a and 32a transform dimensionally, yarns 31b and 32b remain dimensionally-stable (i.e., in their original dimensions). Accordingly, yarns 31b and 32b may be utilized to ensure that the shape and dimensions of textile 30 are retained, despite the dimensional transformation of yarns 31a and 32a.

Third Textile Structure

Figure 6:
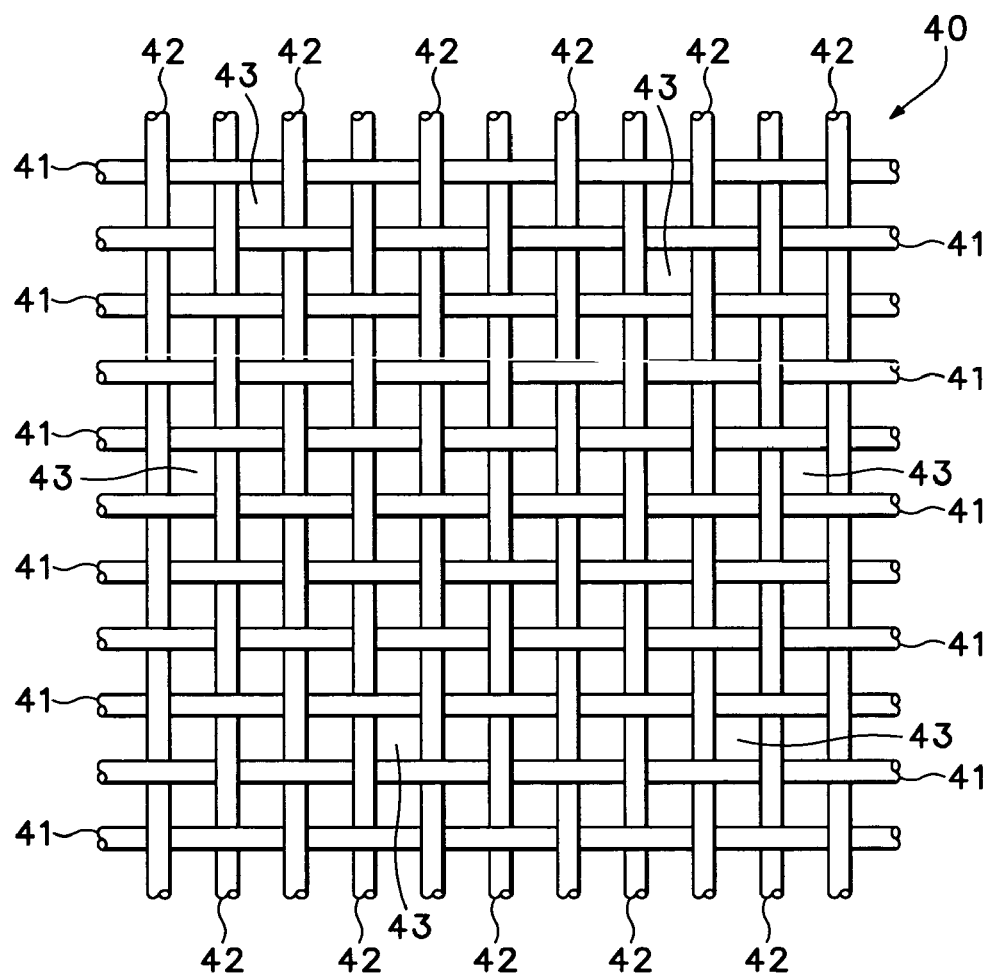
FIG. 6 is a plan view of a portion of a third textile structure in an unexposed state.
Figure 7:
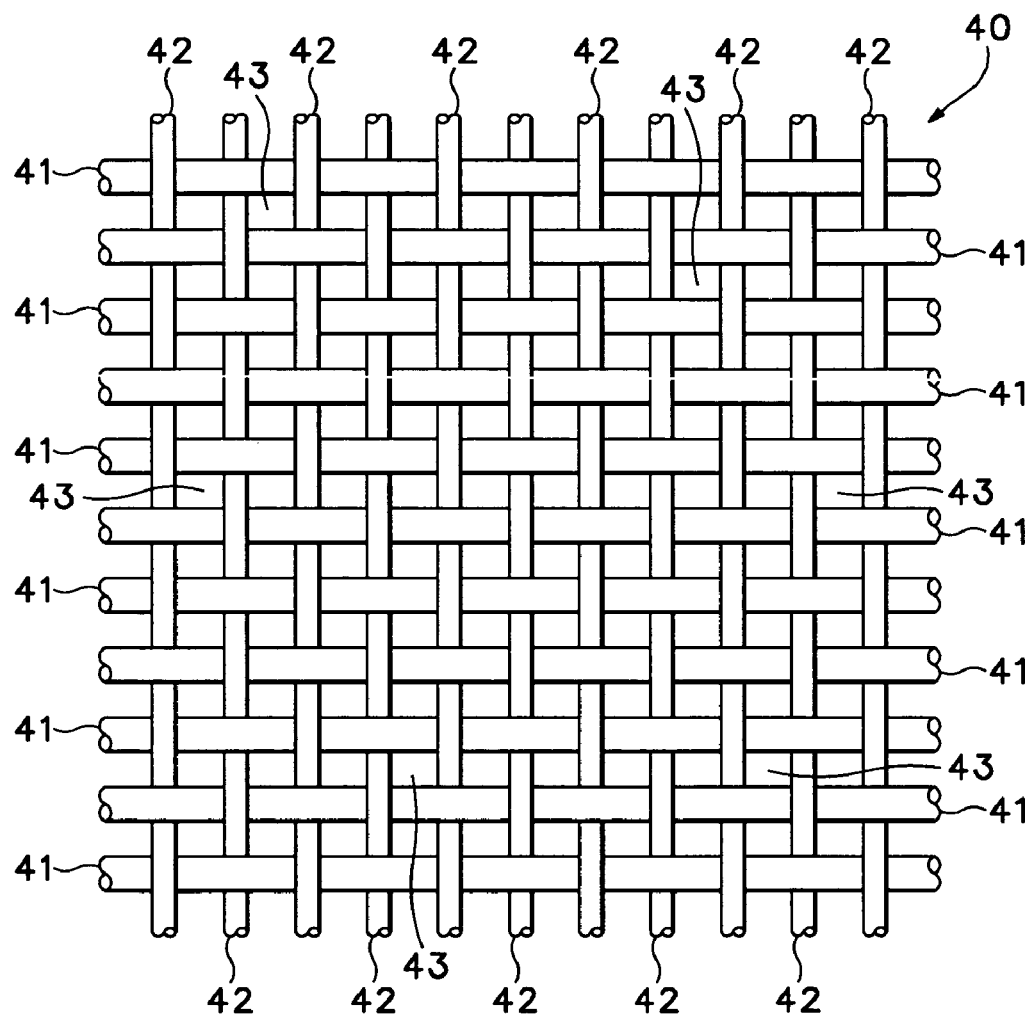
FIG. 7 is a plan view of the portion of the third textile structure in an exposed state.

Another potential configuration for the textile that forms at least a portion of apparel 10 is disclosed in FIGS. 6 and 7, in which a plurality of weft yarns 41 and a plurality of warp yarns 42 define various openings 43. Whereas weft yarns 41 are formed from a material that dimensionally-transforms in the presence of a physical stimulus, warp yarns 42 are formed from a dimensionally-stable yarn that is not significantly affected by the physical stimulus. Accordingly, weft yarns 41 do not substantially change dimensions when exposed to the physical stimulus.

Exposing textile 40 to a physical stimulus modifies the structure of textile 40, which has an effect upon the properties of textile 40. With reference to FIG. 6, textile 40 is depicted in an unexposed state, in which yarns 41 and 42 are not exposed to the physical stimulus. With reference to FIG. 7, however, textile 40 is depicted in an exposed state, in which yarns 41 and 42 are exposed to the physical stimulus. As with textiles 20 and 30, exposing yarns 41 and 42 to the physical stimulus causes yarns 41 to increase in thickness, which decreases the area of each opening 43 and modifies the structure of textile 40. The modification in the structure of textile 40 (i.e., decreasing the area of openings 43) changes the properties of textile 40. In the unexposed state, each opening 33 is relatively large. In the exposed state, however, the area of each opening 33 is decreased, which decreases the overall permeability of textile 30 to water, light, and moving air, for example. Given that textile 40 may replace textile 20 in apparel 10, exposing textile 40 to a physical stimulus may be utilized to effectively change the permeability properties of apparel 10. As with textile 30, forming warp yarns 42 from a dimensionally-stable yarn that is not significantly affected by the physical stimulus ensures that the shape and dimensions of textile 40 are retained, despite the dimensional transformation of weft yarns 41.

Fourth Textile Structure

The configurations of textiles 20, 30, and 40 may be utilized to protect or otherwise insulate the individual from specific environmental conditions. As discussed above, the dimensional transformation of various yarns induces the openings between the yarns to decrease in area. The decrease in area decreases the permeability of textiles 20, 30, and 40, thereby permitting less rain, sunlight, or wind to enter apparel 10. It may be desirable in some situations, however, to increase the permeability of the textile forming apparel 10. For example, increasing the permeability may be utilized to increase air flow through the textile forming apparel 10, thereby enhancing the removal of perspiration from the individual.

Figure 8:
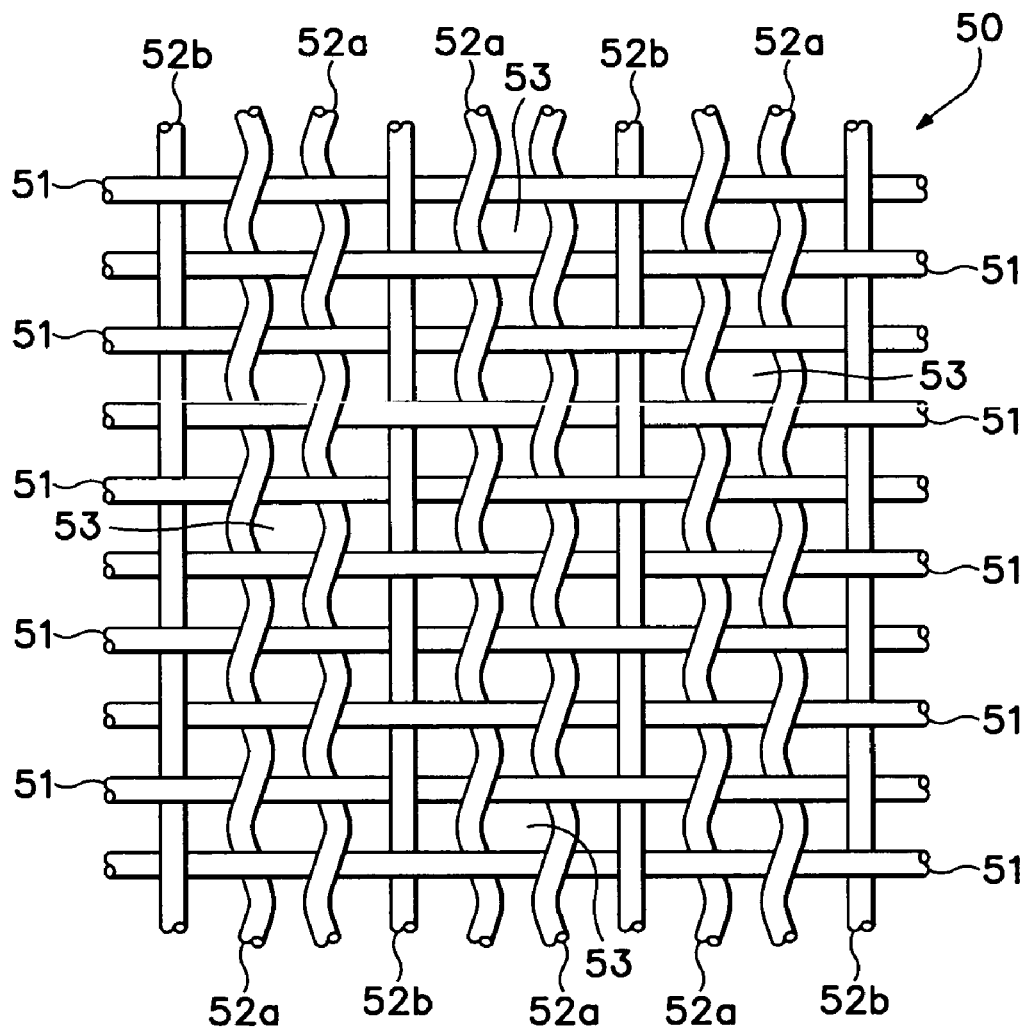
FIG. 8 is a plan view of a portion of a fourth textile structure in an unexposed state.
Figure 9:
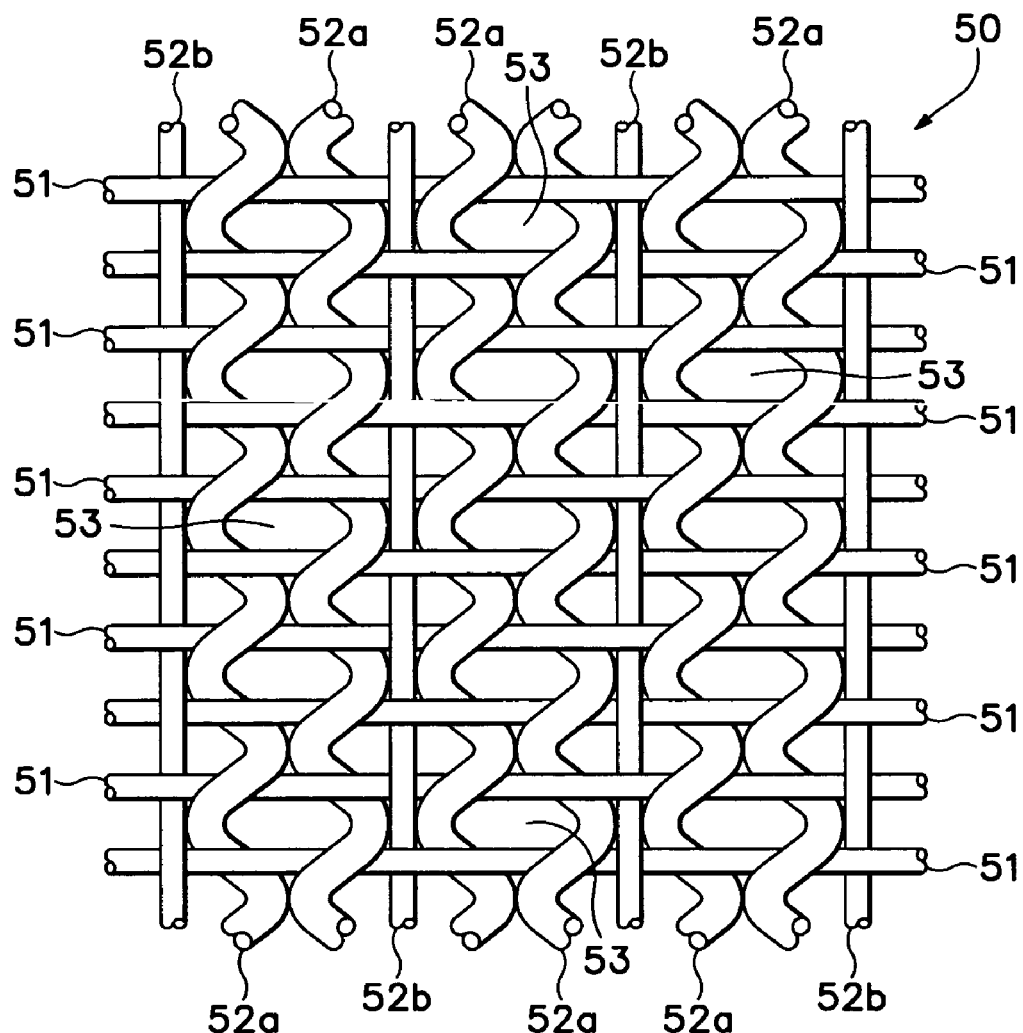
FIG. 9 is a plan view of the portion of the fourth textile structure in an exposed state.

A textile 50 with the structure of an interwoven material that includes a plurality of weft yarns 51, a plurality of warp yarns 52a, and a plurality of warp yarns 52b is depicted in FIGS. 8 and 9. Textile 50 may be formed, therefore, by mechanically-manipulating yarns 51, 52a, and 52b thorough an interweaving process, which involves crossing and interweaving weft yarns 51 at substantially right angles to yarns 52a and 52b. The process of crossing and interweaving weft yarns 51 at substantially right angles to yarns 52a and 52b forms a plurality of discrete openings 53.

Whereas yarns 52a are formed from a material that dimensionally-transforms in the presence of a physical stimulus, yarns 51 and 52b are formed from a dimensionally-stable yarn that is not significantly affected by the physical stimulus. In addition, warp yarns 52a exhibit an undulating or otherwise wavy configuration, whereas yarns 51 and 52b are relatively straight.

The manner in which exposing textile 50 to a physical stimulus has an effect upon the properties of textile 50 will now be discussed. With reference to FIG. 8, textile 50 is depicted in an unexposed state, in which yarns 51, 52a, and 52b are not exposed to the physical stimulus. With reference to FIG. 9, however, textile 50 is depicted in an exposed state, in which yarns 51, 52a, and 52b are exposed to the physical stimulus. In the unexposed state, yarns 51, 52a, and 52b exhibit dimensions with a relatively narrow thickness such that the area of each opening 53 is relatively small. In the exposed state, however, warp yarns 52a exhibit a greater thickness and a greater degree of undulation, which increases the area of each opening 53. That is, exposing yarns 51, 52a, and 52b to the physical stimulus causes warp yarns 52a to increase in thickness and degree of undulation, which increases the area of each opening 53 and modifies the structure of textile 50.

The modification in the structure of textile 50 (i.e., increasing the area of openings 53) changes the properties of textile 50. In the unexposed state, each opening 53 is relatively small. In the exposed state, however, the area of each opening 53 is increased, which increases the overall permeability of textile 50 to water, light, and moving air, for example. That is, the greater area of each opening 53 in the exposed state increases the ease with which water, light, and moving air may penetrate through textile 50. Accordingly, exposing textile 50 to a physical stimulus increases the permeability properties of textile 50, thereby increasing the permeability properties of apparel 10.

When incorporated into article of apparel 10, textile 50 may be utilized to cool the individual and remove perspiration from the individual, for example. Based upon the above discussion, therefore, textile 50 may be formed from various warp yarns 52a that transform dimensionally and in degree of undulation in the presence of a physical stimulus. The dimensional transformation of warp yarns 52a modifies the structure of textile 50, thereby inducing a change in the properties of textile 50. When incorporated into apparel 10, the change in the properties of textile 50 when exposed to the physical stimulus may be utilized to cool the individual and remove perspiration from the individual. Accordingly, textile 50 effectively adapts to changing perspiration levels of the individual in order to enhance the comfort of the individual wearing apparel 10.

Fifth Textile Structure

Figure 10:
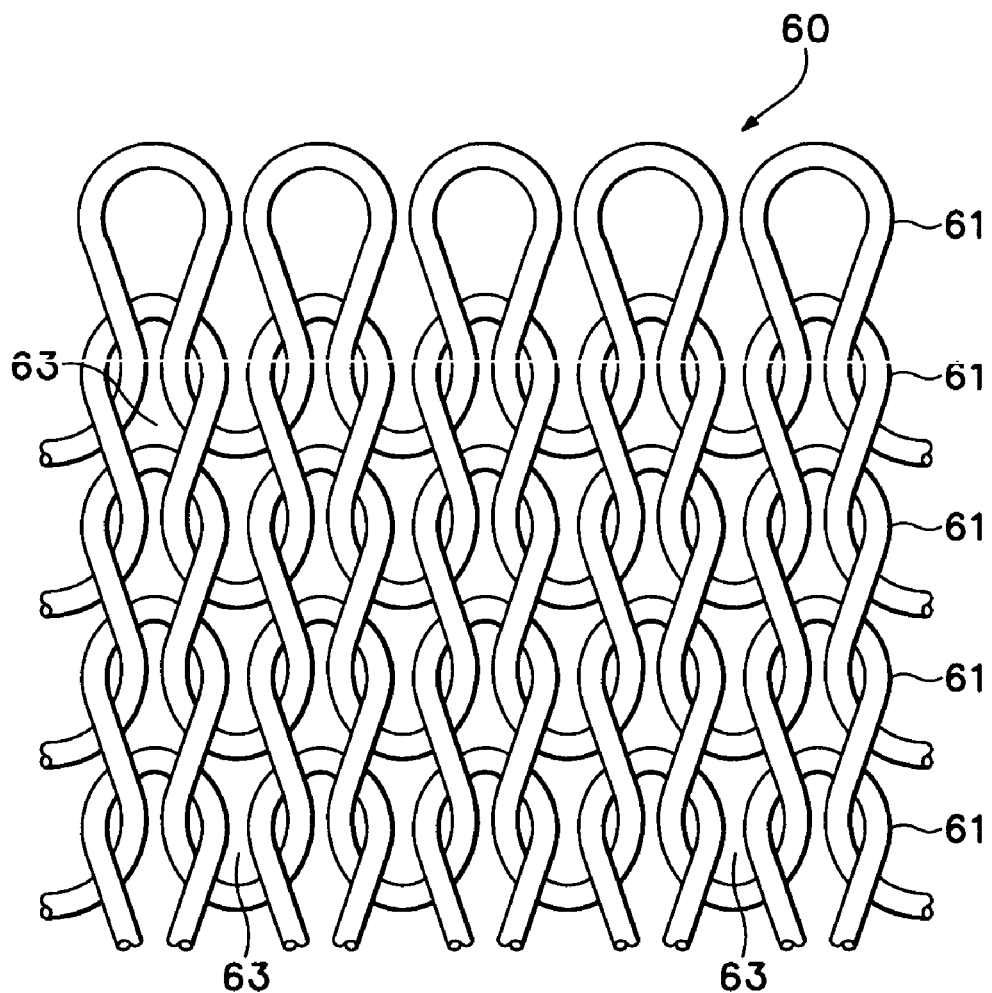
FIG. 10 is a plan view of a portion of a fifth textile structure in an unexposed state.
Figure 11:
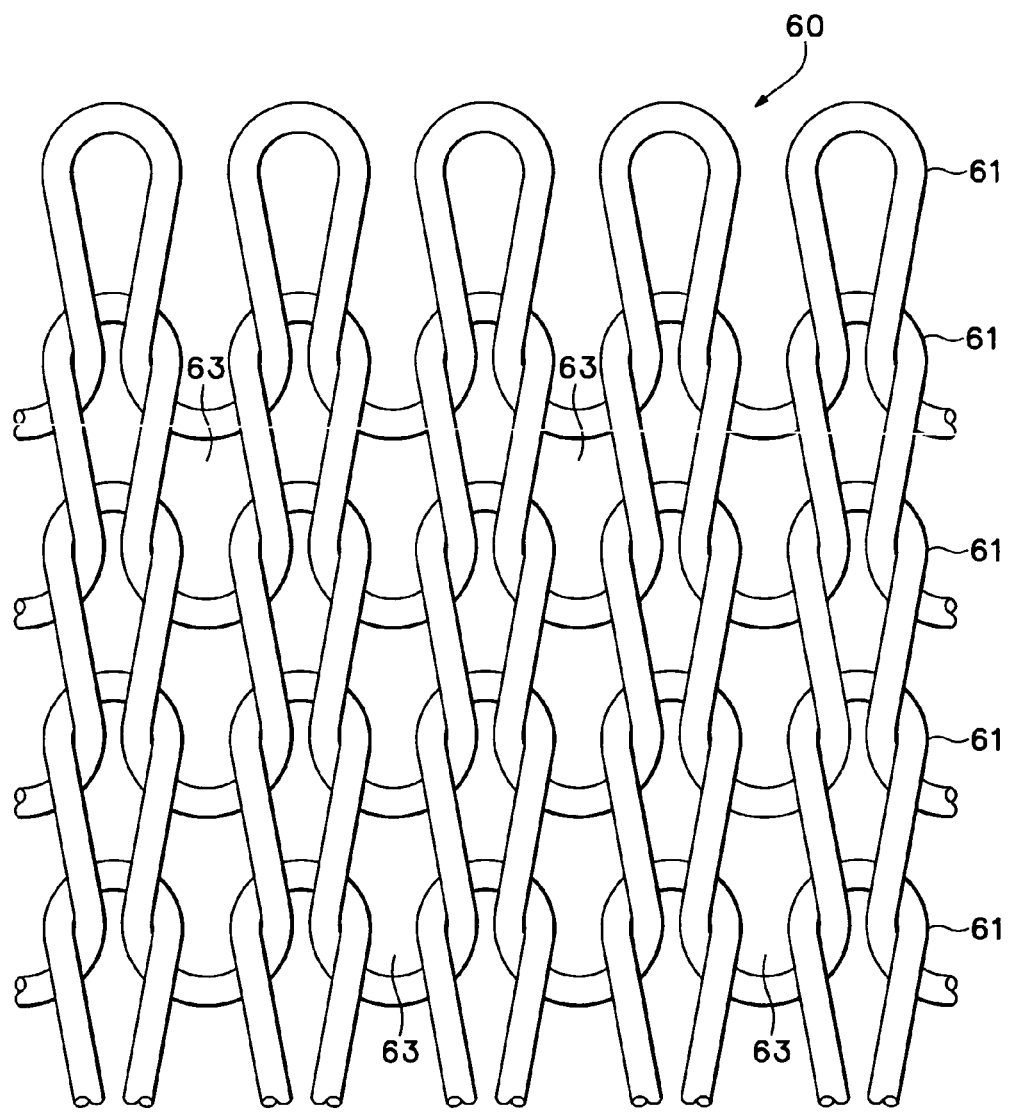
FIG. 11 is a plan view of the portion of the fifth textile structure in an exposed state.

Each of textiles 20, 30, 40, and 50 are formed thorough an interweaving process, which involves crossing and interweaving weft yarns and warp yarns at substantially right angles to each other. A textile that adapts to changing perspiration levels of the individual, for example, in order to enhance the comfort of the individual may also be formed through other methods of mechanically-manipulating yarns. Referring to FIGS. 10 and 11, a textile 60 that is formed through an interlooping process is disclosed. Interlooping involves the formation of a plurality of columns of intermeshed loops, with knitting being the most common method of interlooping. Textile 60 includes a plurality of courses (i.e., a row of needle loops produced by adjacent needles during the knitting cycle) and a plurality of wales (i.e., a column of intermeshed needle loops generally produced by the same needle the knits at successive knitting cycles) that are formed from a yarn 61.

Yarn 61 is formed from a material that dimensionally-transforms in the presence of a physical stimulus. More particularly, the dimensions of yarn 61 (i.e., length and thickness, for example) may increase in the presence of the physical stimulus. When exposed to a physical stimulus, yarn 61 dimensionally-transforms in both length and thickness. Although an increase thickness would appear to decrease the area of each opening 62, the associated increase in length separates the various portions of yarn 61 to a greater degree and actually increases the area of each opening 63. That is, the increase in thickness has a greater effect upon the area of openings 63 than the increase in thickness, thereby increasing the overall area of each opening 63. When exposed to the physical stimulus, therefore, the permeability of textile 60 may increase.

The manner in which exposing textile 60 to a physical stimulus has an effect upon the properties of textile 60 will now be discussed in greater detail. With reference to FIG. 10, textile 60 is depicted in an unexposed state, in which yarn 61 is not exposed to the physical stimulus. With reference to FIG. 11, however, textile 60 is depicted in an exposed state, in which yarn 61 is exposed to the physical stimulus. In the unexposed state, the area of each opening 63 is relatively small. In the exposed state, however, yarn 61 exhibits a greater thickness and a greater length. As discussed above, the increase in length dominates the increase in thickness in order to increase the overall area of each opening 63. That is, exposing yarn 60 to the physical stimulus causes yarn 60 to increase in length, which increases the area of each opening 63 and modifies the structure of textile 60.

The modification in the structure of textile 60 (i.e., increasing the area of openings 63) changes the properties of textile 60. In the unexposed state, each opening 63 is relatively small. In the exposed state, however, the area of each opening 63 is increased, which increases the overall permeability of textile 60 to water, light, and moving air, for example. That is, the greater area of each opening 63 in the exposed state increases the ease with which water, light, and moving air may penetrate through textile 60. Accordingly, exposing textile 60 to a physical stimulus increases the permeability properties of textile 60, thereby increasing the permeability properties of apparel 10.

When incorporated into article of apparel 10, textile 60 may be utilized to cool the individual and remove perspiration from the individual, for example. Based upon the above discussion, therefore, textile 60 may be formed from yarn 61, which transforms dimensionally and in degree of undulation in the presence of a physical stimulus. The dimensional transformation of yarn 61 modifies the structure of textile 60, thereby inducing a change in the properties of textile 60. When incorporated into apparel 10, the change in the properties of textile 60 when exposed to the physical stimulus may be utilized to cool the individual and remove perspiration from the individual. Accordingly, textile 60 effectively adapts to changing perspiration levels of the individual in order to enhance the comfort of the individual wearing apparel 10.

Sixth Textile Structure

Increasing or decreasing the area of openings between the various yarns that form a textile is one manner in which the structure of the textile may be modified in order to change the properties (i.e., permeability) of the textile. In some embodiments, the texture of the textile may also be modified in order to change the properties of the textile. Referring to FIGS. 12-15, a textile 70 is disclosed. Textile 70 is formed from a yarn 71 and a yarn 72 through an interlooping process. As will be described in greater detail below, the texture of textile 70 changes from being relatively smooth to having a plurality of nodes 73 that form a separation between the individual and textile 70. Nodes 73 effectively hold textile 70 away from the individual and permit air to flow between textile 70 and the individual, thereby increasing removal of perspiration. In order to form textile 70, yarns 71 and 72 are mechanically-manipulated through a circular knitting process to form textile 70 with a jersey knit or double knit pique structure, for example. In some embodiments, three or more yarns may be utilized to form textile 70, and a variety of other knit structures in addition to the jersey knit and double knit pique structure may be utilized.

Whereas yarn 71 is formed from a material that dimensionally-transforms in the presence of a physical stimulus, yarn 72 is formed from a dimensionally-stable yarn that is not significantly affected by the physical stimulus. Accordingly, yarn 71 substantially changes dimensions when exposed to the physical stimulus. Yarn 71 extends through the structure formed by yarn 72 and is primarily positioned on one side of textile 70. That is, the position of yarn 71 is concentrated on one side of textile 70. When exposed to the physical stimulus, yarn 71 transforms dimensionally, whereas yarn 72 remains dimensionally-stable. The dimensions of yarn 71 increase when exposed to the physical stimulus and form a plurality of nodes 73 on one side of textile 70. That is, the concentrated areas of yarn 71 expand when exposed to the physical stimulus and form nodes 73.

Figure 12:
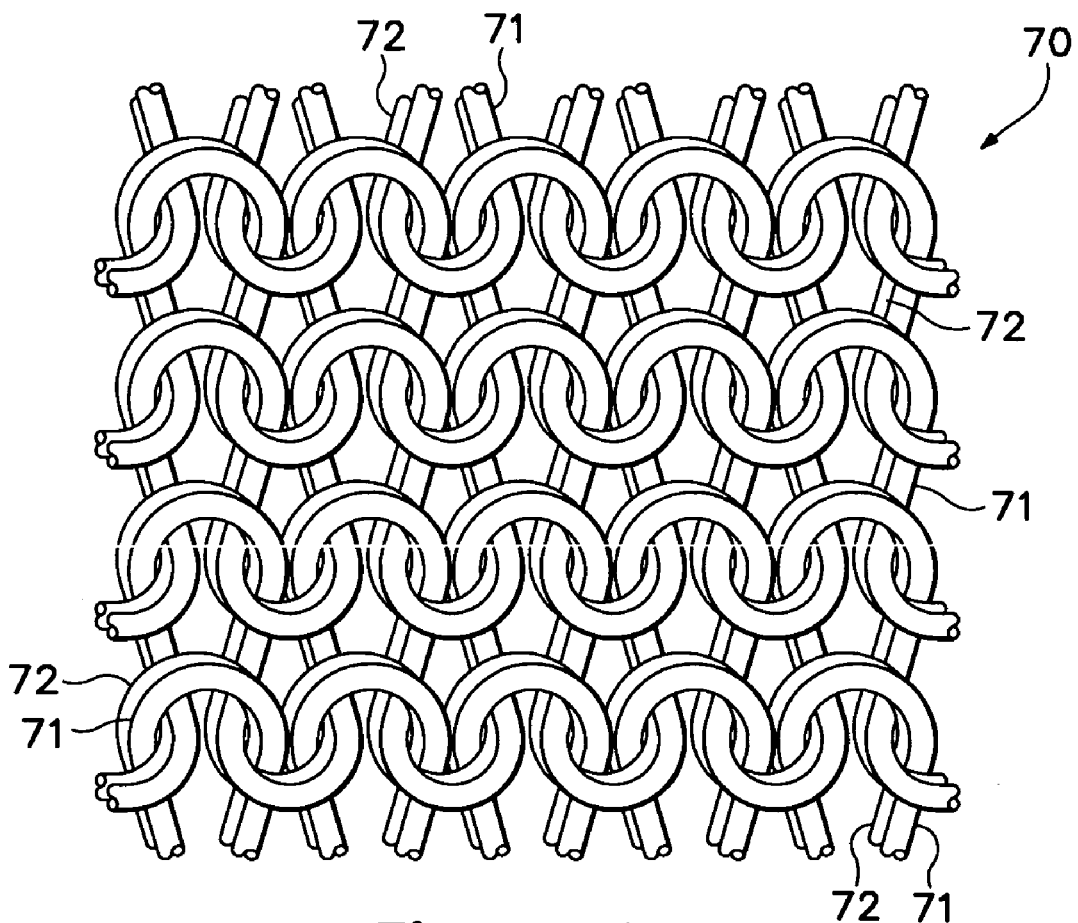
FIG. 12 is a plan view of a portion of a sixth textile structure in an unexposed state.
Figure 13:
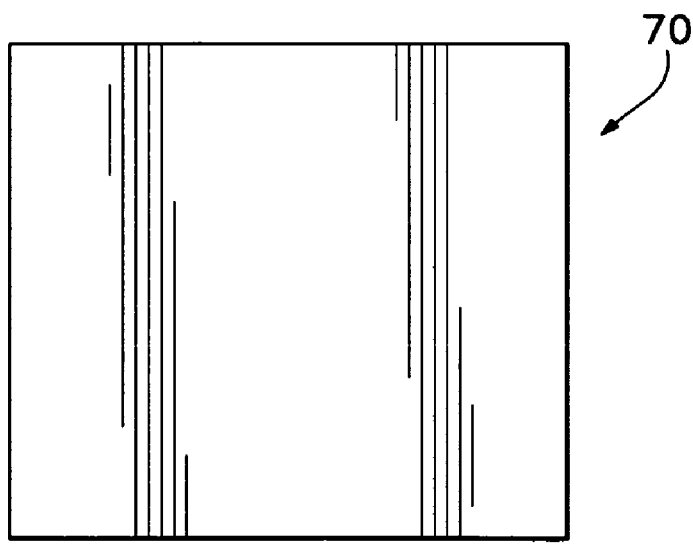
FIG. 13 is a schematic plan view of a larger portion of the sixth textile structure in the unexposed state.
Figure 14:
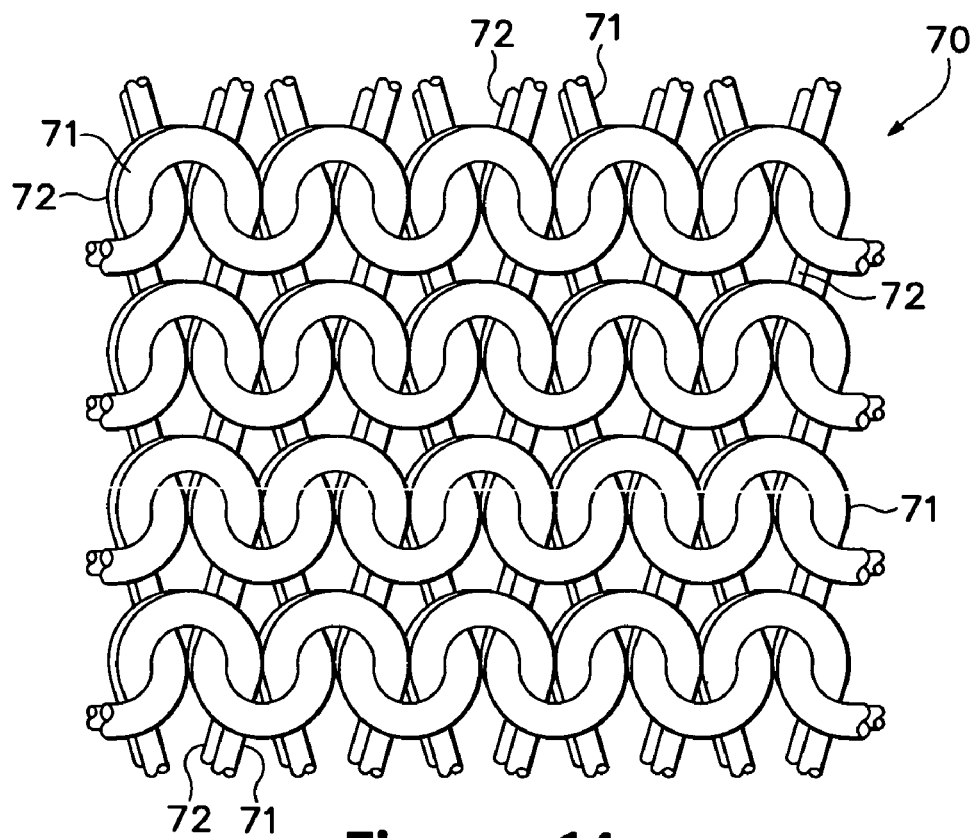
FIG. 14 is a plan view of the portion of the sixth textile structure in an exposed state.
Figure 15:
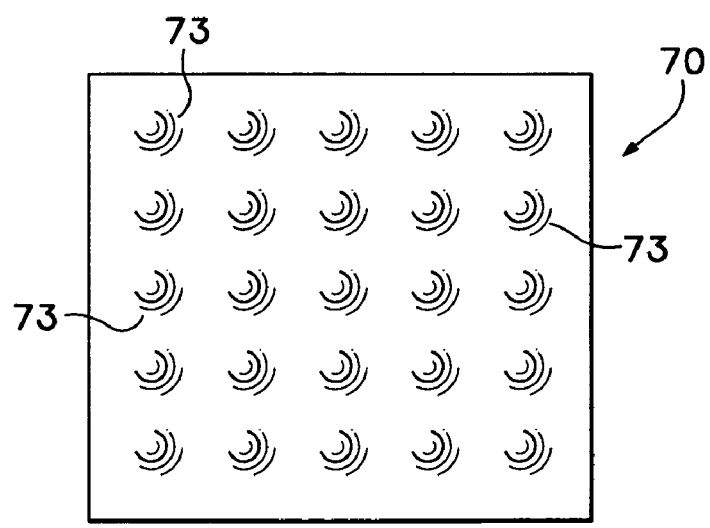
FIG. 15 is a schematic plan view of the larger portion of the sixth textile structure in the exposed state.

With reference to FIGS. 12 and 13, textile 70 is depicted in an unexposed state, in which yarns 71 and 72 are not exposed to the physical stimulus. With reference to FIGS. 14 and 15, however, textile 70 is depicted in an exposed state, in which yarns 71 and 72 are exposed to the physical stimulus. In the unexposed state, textile 70 exhibits a relatively smooth texture. In the exposed state, however, textile 70 exhibits greater texture due to the presence of the plurality of nodes 73. That is, exposing yarn 71 to the physical stimulus forms nodes 73 on one side of textile 70 and causes textile 70 to increase in texture, which modifies the structure of textile 70.

The modification in the structure of textile 70 changes the properties of textile 70. In the unexposed state, textile 70 is relatively smooth and significantly contacts the individual. In the exposed state, however, the texture of textile 70 is increased through the formation of nodes 73, which forms a separation between the individual and textile 70. That is, nodes 73 effectively hold textile 70 away from the individual and permit air to flow between textile 70 and the individual, thereby increasing the rate at which perspiration is removed. Exposing textile 70 to a physical stimulus increases the texture of textile 70, thereby increasing the texture properties of apparel 10. Accordingly, textile 70 effectively adapts to changing perspiration levels of the individual in order to enhance the comfort of the individual wearing apparel 10.

Seventh Textile Structure

Textiles generally fall into two categories, as discussed above in the Background of the Invention section. The first category includes textiles produced directly from webs of fibers or filaments by bonding, fusing, or interlocking to construct non-woven fabrics and felts. The second category includes textiles formed through a mechanical manipulation of yarn. Textiles, 20, 30, 40, 50, 60, and 70 are each formed through the mechanical manipulation of yarn and fall, therefore, within the second category. Concepts related to the present invention also apply, however, to non-woven textiles.

Figure 16:
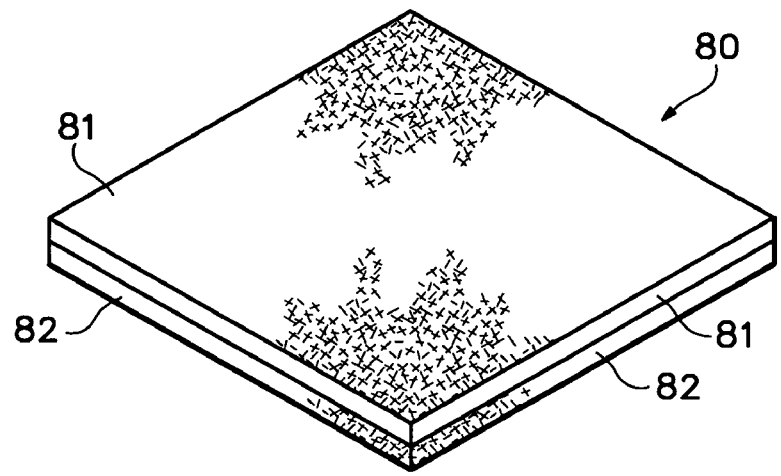
FIG. 16 is a perspective view of a portion of a seventh textile structure.

With reference to FIG. 16, a textile 80 having the configuration of a non-woven textile is disclosed an includes a plurality of filaments 81 and a plurality of filaments 82. Non-woven textiles are generally manufactured by depositing one or more layers of polymer filaments upon a moving conveyor, thereby forming the non-woven textile to have a generally uniform thickness. Textile 80 includes two layers, one being formed from a plurality of filaments 81, and the other being formed from a plurality of filaments 82.

Whereas filaments 81 are formed from a material that dimensionally-transforms in the presence of a physical stimulus, filaments 82 are formed from a dimensionally-stable material that is not significantly affected by the physical stimulus. Accordingly, filaments 81 substantially change dimensions when exposed to the physical stimulus. Filaments 81 form one of the layers of textile 80 and are primarily positioned on one side of textile 80. That is, the position of filaments 81 is concentrated on one side of textile 80. When exposed to the physical stimulus, filaments 81 transform dimensionally, whereas filaments 82 remain dimensionally-stable. As with textile 70, which also has concentrations of different yarns on different sides, the dimensions of filaments 81 increase when exposed to the physical stimulus and may form a plurality of nodes on one side of textile 80. That is, the concentrated areas of filaments 81 expand when exposed to the physical stimulus and may form nodes that are similar to nodes 73.

Textile 80 is depicted as having two non-woven layers formed from filaments 81 and filaments 82. In some embodiments of the invention, the layer formed from filaments 82 may be replaced with a textile formed through mechanical manipulation of a yarn. That is, the layer formed from filaments 82 may be formed from a textile in the second category discussed above. When formed to exhibit this structure, the layer of filaments 81 may be bonded or stitched to the other textile layer, for example. In other embodiments, the layer formed from filaments 81 may be replaced with textile 60 or any of the other textiles disclosed above, for example. Furthermore, a textile may be formed that solely includes a layer of filaments 81. In yet further embodiments, a textile may exhibit a configuration wherein filaments 81 and 82 are distributed homogenously throughout the thickness of the textile. Accordingly, a variety of non-woven textile structures may be formed from filaments that transform dimensionally in the presence of a physical stimulus.

Eighth Textile Structure

Figure 17:
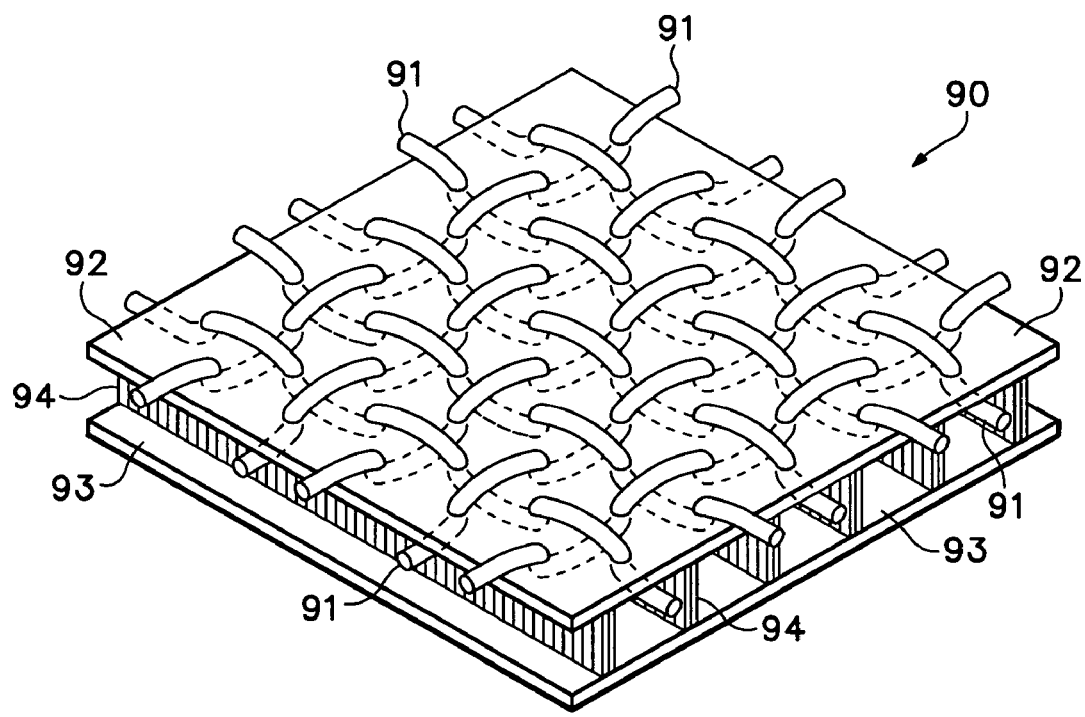
FIG. 17 is a perspective view of a portion of an eighth textile structure.

Each of textiles 70 and 80 exhibit a configuration wherein the dimensionally-stable materials (i.e., yarn 72 and filaments 82) are concentrated adjacent to one surface, and the materials that transform dimensionally in the presence of a physical stimulus (i.e., yarn 71 and filaments 81) are concentrated adjacent an opposite surface. Another manner in which this general configuration may be achieved is disclosed in FIG. 17, wherein a textile 90 includes a yarn 91 that is plaited in one surface of a spacer mesh material. More particularly, the spacer mesh material includes a first layer 92 and a second layer 93 that are spaced apart and connected by a plurality of connecting yarns 94. Yarn 91, which transforms dimensionally in the presence of a physical stimulus, is woven or otherwise plaited into first layer 92. Whereas yarn 91 is formed of a material that transforms dimensionally in the presence of a physical stimulus, each of first layer 92, second layer 93, and connecting yarns 94 may be formed from a dimensionally-stable material.

In manufacturing textile 90, a double needle bar Raschel knitting process may be utilized to form first layer 92, second layer 93, and connecting yarns 94 from the dimensionally-stable material. Yarn 91 is then plaited or otherwise incorporated into first layer 92. In further embodiments of the invention, all of first layer 92 may be formed from a material that transforms dimensionally in the presence of a physical stimulus. Alternately, first layer 92, second layer 93, and connecting yarns 94 may be formed from a material that transforms dimensionally in the presence of a physical stimulus, and yarn 91 may be formed from a dimensionally-stable material. Accordingly, a variety of configurations may be utilized in connection with a spacer mesh material to provide a configuration wherein the dimensionally-stable materials are concentrated adjacent to one surface, and the materials that transform dimensionally in the presence of a physical stimulus are concentrated adjacent to an opposite surface. In some embodiments, however, all or a substantially portion of a spacer mesh material may be formed from a dimensionally-stable material.

Ninth Textile Structure

Figure 18:
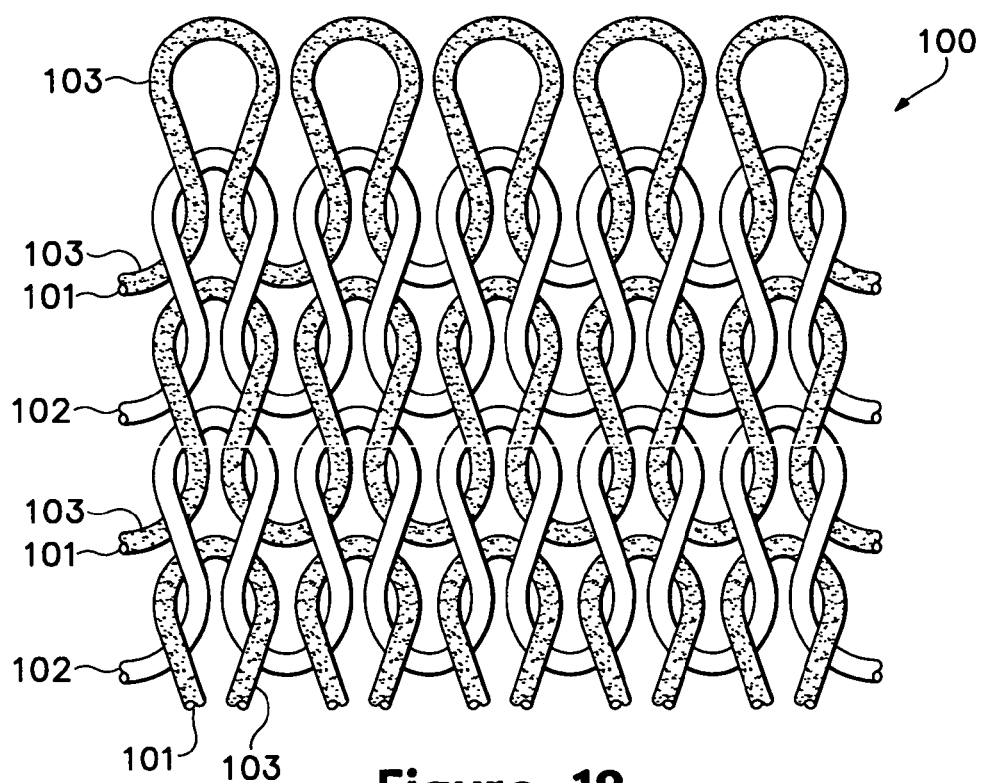
FIG. 18 is a plan view of a portion of a ninth textile structure.
Figure 19:
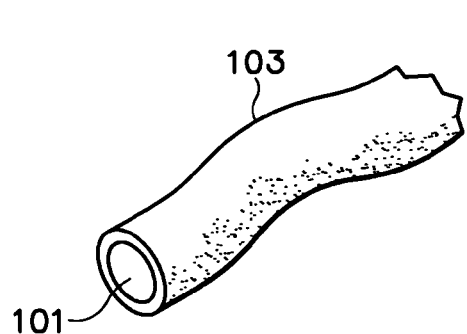
FIG. 19 is a schematic perspective view of a coated yarn from the ninth textile structure in an unexposed state.
Figure 20:
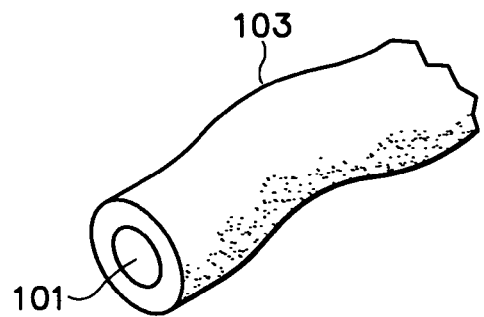
FIG. 20 is a schematic perspective view of the coated yarn from the ninth textile structure in an exposed state.

In the various textile structures discussed above, a fiber, filament, or yarn incorporated into a textile has a configuration that transforms dimensionally in the presence of a physical stimulus. Coatings on the fibers, filaments, or yarns may also be utilized as the material that transforms dimensionally in the presence of a physical stimulus. With reference to FIG. 18, a textile 100 that includes a yarn 101 and a yarn 102 is disclosed. Yarn 101 and yarn 102 are formed from a material that is dimensionally-stable. In contrast with yarn 102, however, yarn 101 includes a coating 103 that transforms dimensionally in the presence of a physical stimulus. FIGS. 18 and 19 depict yarn 101 and coating 103 in an unexposed state (i.e., yarn 101 and coating 103 are not exposed to the physical stimulus). In the unexposed state yarn 102 and the combination of yarn 101 and coating 103 have similar diameters. FIG. 20 depicts yarn 101 and coating 103 in an exposed state, and the overall diameter of coating 103 is increased substantially. Accordingly, exposing textile 100 to the physical stimulus induces the combination of yarn 101 and coating 103 to transform dimensionally.

In some embodiments, the diameter of yarn 101 remains substantially constant whether exposed or unexposed to the physical stimulus, and coating 103 swells or otherwise transforms dimensionally in the presence of a physical stimulus. In other embodiments, coating 103 may compress yarn 101 when exposed to the physical stimulus. In any event, however, the overall diameter of the combination of yarn 101 and coating 103 increases when exposed to the physical stimulus. Although yarn 101 may be formed from a material that is dimensionally-stable in the presence of the physical stimulus, yarn 101 may also be formed from a material that transforms dimensionally in the presence of a physical stimulus.

Coating 103 may be added to yarn 101 prior to forming textile 100. An advantage of this procedure is that specific yarns within textile 100 include coating 103. In other embodiments, coating 103 may be added to textile 100 following the formation of textile 100. That is, a printing process (e.g., a screen-printing process) may be utilized to place coating 103 over a defined area of textile 100. In contrast with the configuration depicted in FIG. 18, the use of a printing process applies coating 103 to areas of textile 100, rather than individual yarns within textile 100.

Summary of Textile Structures

Based upon the above discussion, various textiles may be formed from fibers, filaments, or yarns that transform dimensionally in the presence of a physical stimulus. The dimensional transformation of the yarns modifies the structures of the textiles, thereby inducing a change in the properties of textiles. Depending upon the material selected for the yarns, water or a change in the temperature of the textiles, for example, may be utilized as the physical stimulus. When incorporated into an article of apparel, the change in the properties of the textiles when exposed to the physical stimulus may be utilized to insulate the individual from specific environmental conditions or adapt to changing perspiration levels of the individual, for example. Accordingly, the present invention relates to textiles that effectively adapt to enhance the comfort of the individual wearing the apparel.

II. Exemplar Altered Textile Structures

The above material disclosed a variety of textiles with a structure that is modified by a physical stimulus in order to change the properties of the textile. Various ways in which these or other textile structures may be altered will now be discussed. For example, materials may be bonded to a textile structure in order to impart stretch resistance incisions or partial incisions may be formed in the textile structure, or coatings may be applied to block effects of the physical stimulus.

First Altered Textile Structure

Each of the textile structures discussed above are primarily formed from various filaments, fibers, or yarns. Depending upon the specific materials that form the filaments, fibers, or yarns, the various textiles disclosed above may exhibit substantial stretch characteristics. That is, the textiles may deform significantly when exposed to a tensile force. In order to limit stretch in the textiles, various materials with a greater degree of stretch resistance may be bonded or otherwise secured to the textiles.

Figure 21:
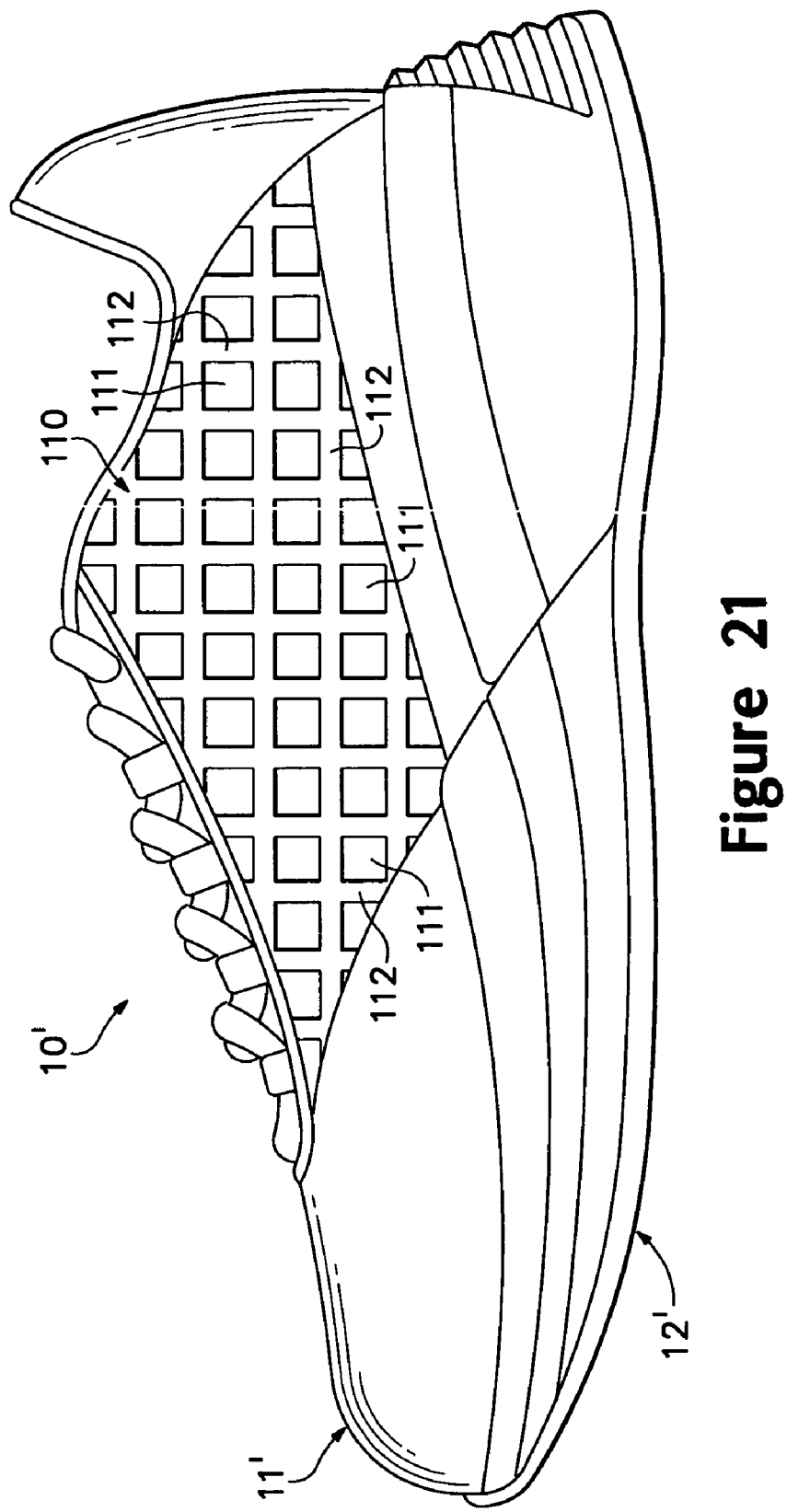
FIG. 21 is a side elevational view of an article of footwear incorporating a first altered textile structure in accordance with the present invention.
Figure 22:
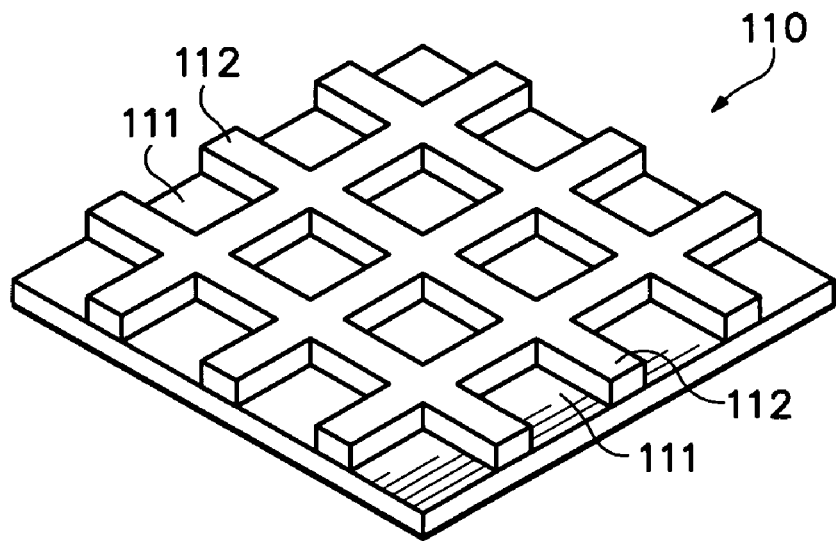
FIG. 22 is a perspective view of a portion of the first altered textile structure.
Figure 23:
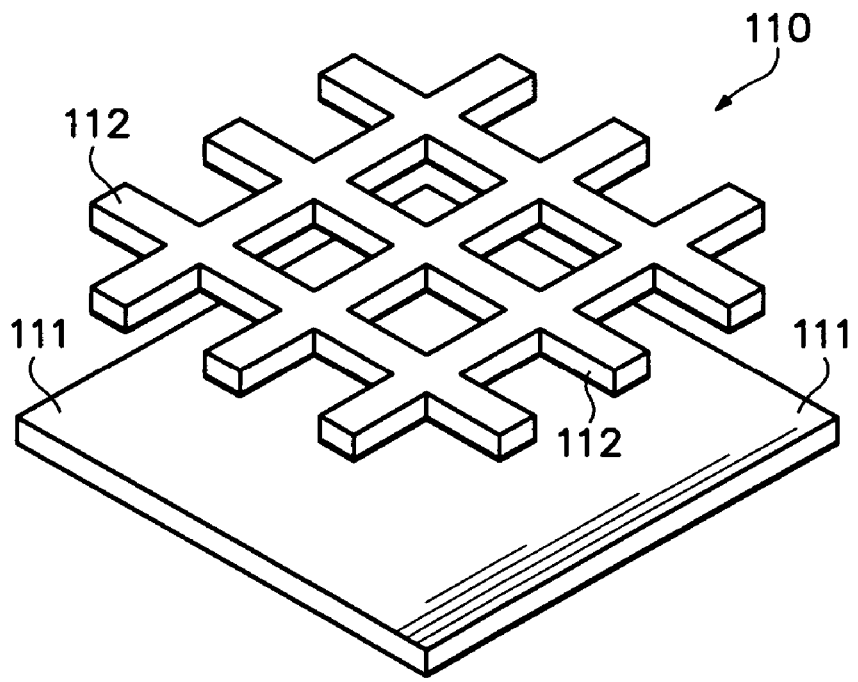
FIG. 23 is an exploded perspective view of the first altered textile structure.

With reference to FIG. 21, another article of apparel is disclosed, specifically an article of footwear 10' having an upper 11' and a sole structure 12'. In contrast with conventional articles of footwear, upper 11' incorporates a textile 110 having a base layer 111 and a reinforcing structure 112, as depicted in FIGS. 22 and 23. Base layer 111 may be any of the various textile structures disclosed above. That is, base layer 111 may be any of textiles 20, 30, 40, 50, 60, 70, 80, 90, or 100. Accordingly, base layer 111 has a structure that is modified by a physical stimulus in order to change the overall properties of textile 110.

Reinforcing structure 112 is a polymer sheet, for example, having a plurality of generally square apertures that define the configuration of a grid with horizontal segments that cross vertical segments. Whereas base layer 111 may stretch significantly when subjected to a tensile force, reinforcing structure 112 stretches to a lesser degree when subjected to the same tensile force. In this configuration, the stretch resistance of reinforcing structure 112 imparts stretch resistance to the entirety of textile 110. Accordingly, reinforcing structure 112 limits the overall degree to which textile 110 may stretch.

Articles of footwear, such as footwear 10', may be subjected to significant forces when used for walking, running, or other ambulatory activities. More particularly, the foot may exert significant forces upon upper 11' during the athletic activities. These forces may tend to stretch upper 11' or otherwise place the materials of upper 11' in tension. Although a relatively small degree of stretch in upper 11' may enhance the overall comfort of footwear 10', significant stretch may not be beneficial. Accordingly, reinforcing structure 112 limits the overall degree to which textile 110 may stretch, thereby countering the inherent stretch in base layer 111.

As discussed in detail above, each of the various textile structures are modified by a physical stimulus in order to change the overall properties of the textile structures. For example, portions of the textiles may transform dimensionally in the presence of heat or water in order to form apertures that allow heated air or perspiration to escape. Similarly, portions of the textiles may transform dimensionally in the presence of heat or water in order to close apertures that restrict heated air or precipitation from entering footwear 10'. The addition of reinforcing structure 112 to any of the textile structures discussed above enhances the overall properties of the textile structures and the suitability of the textile structures for footwear or other athletic equipment applications. In other words, the combination of base layer 111 and reinforcing structure 112 provides a textile that is modified by a physical stimulus in order to change the overall properties of footwear 10', and also provides a textile with a desired degree of stretch resistance.

Stretch resistance is not the only advantage that may be gained through the addition of reinforcing structure 112. For example, reinforcing structure 112 or similar structures may impart abrasion resistance, thereby enhancing the durability of textile 110. In addition, reinforcing structure 112 may enhance the aesthetic appeal of articles that incorporate textile 110. Furthermore, reinforcing structure 112 may also provide a durable location for securing or otherwise incorporating textile 110 to an article.

Figure 24A:
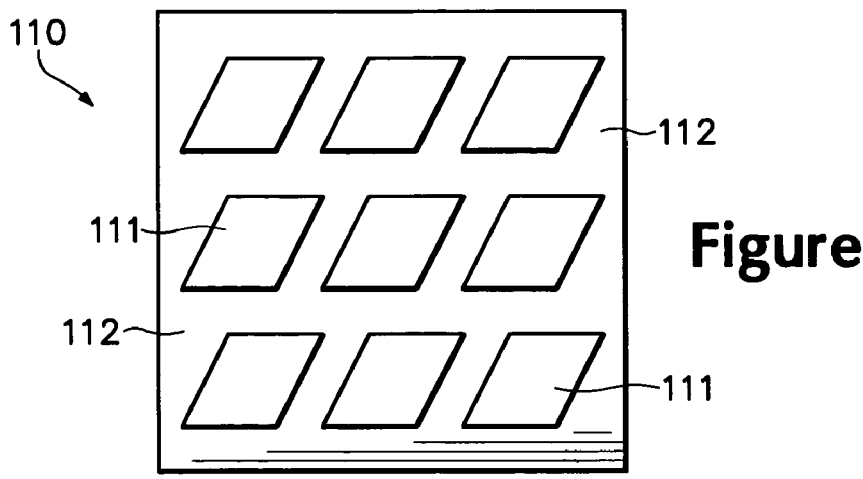
FIGS. 24A-24E are plan views of alternate configurations of the first altered textile structure.
Figure 24B:
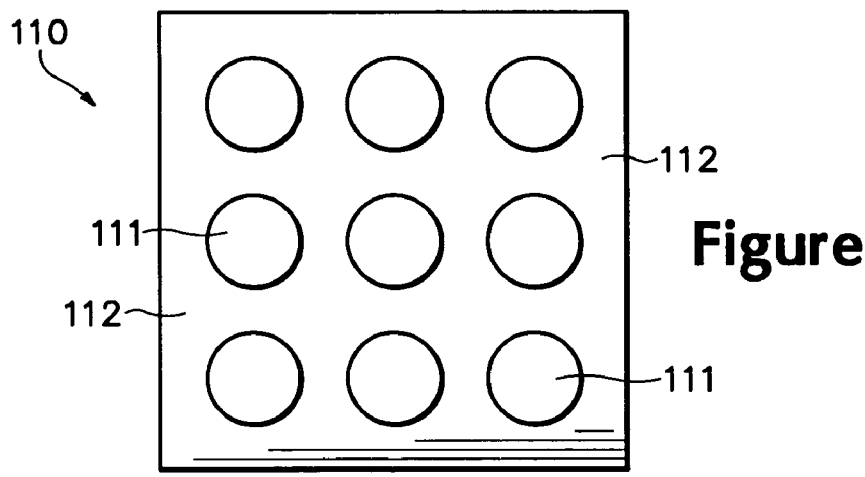
Figure 24C:
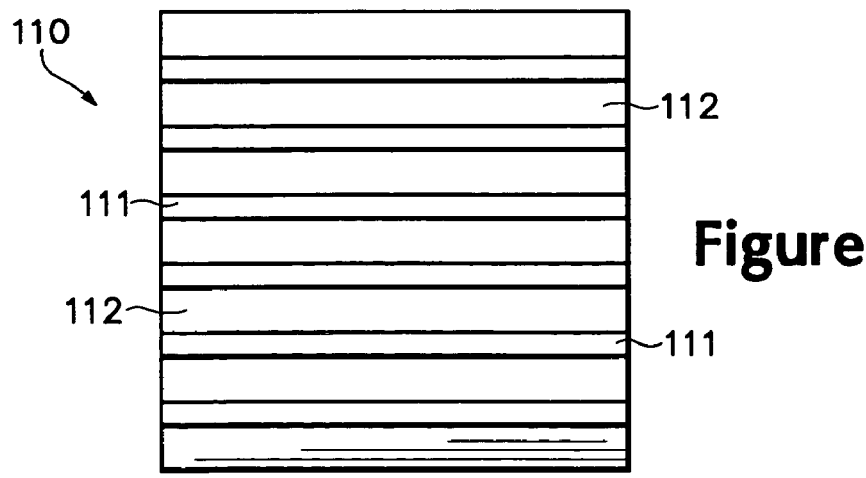
Figure 24D:
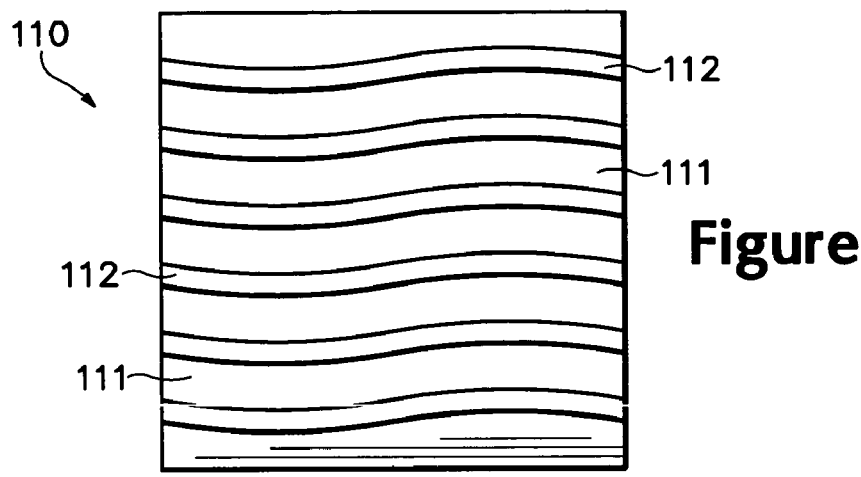
Figure 24E:
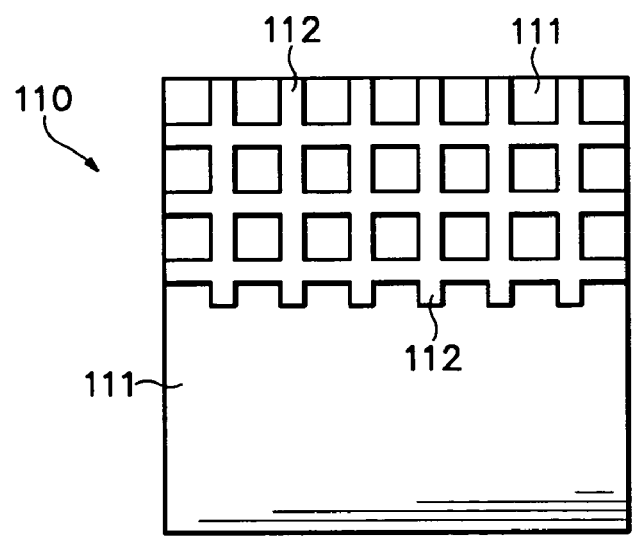

Reinforcing structure 112 is discussed above as having a grid configuration defining generally square apertures. Reinforcing structure 112 may also define trapezoidal or round apertures, as respectively depicted in FIGS. 24A and 24B, or any other practical shape. When stretch resistance is desired in a particular direction, linear or curved strips of reinforcing structure 112 may be combined with base layer 111, as respectively depicted in FIGS. 24C and 24D. In addition, when stretch resistance is desired in only a particular area of a textile, reinforcing structure 112 may be located in only a portion of textile 110. Accordingly, the particular configuration of reinforcing structure 112 may vary significantly depending upon the particular application or requirements for textile 110.

Reinforcing structure 112 is discussed above as a polymer sheet, but may be a variety of other materials within the scope of the present invention. For example, reinforcing structure 112 may be a different textile, a spacer mesh material, leather, synthetic leather, or a film that is secured to base layer 111. Reinforcing structure 112 may also be a polymer that impregnates the structure of base layer 111. That is, a molten polymer material may be injected onto base layer 111 so as to form reinforcing structure 112. In some embodiments, reinforcing structure 112 may be a yarn or filament woven into base layer 111 that is less stretchable than base layer 111. Accordingly, the specific materials that are suitable for reinforcing structure 112 may vary significantly within the scope of the present invention.

Second Altered Textile Structure

Figure 25:
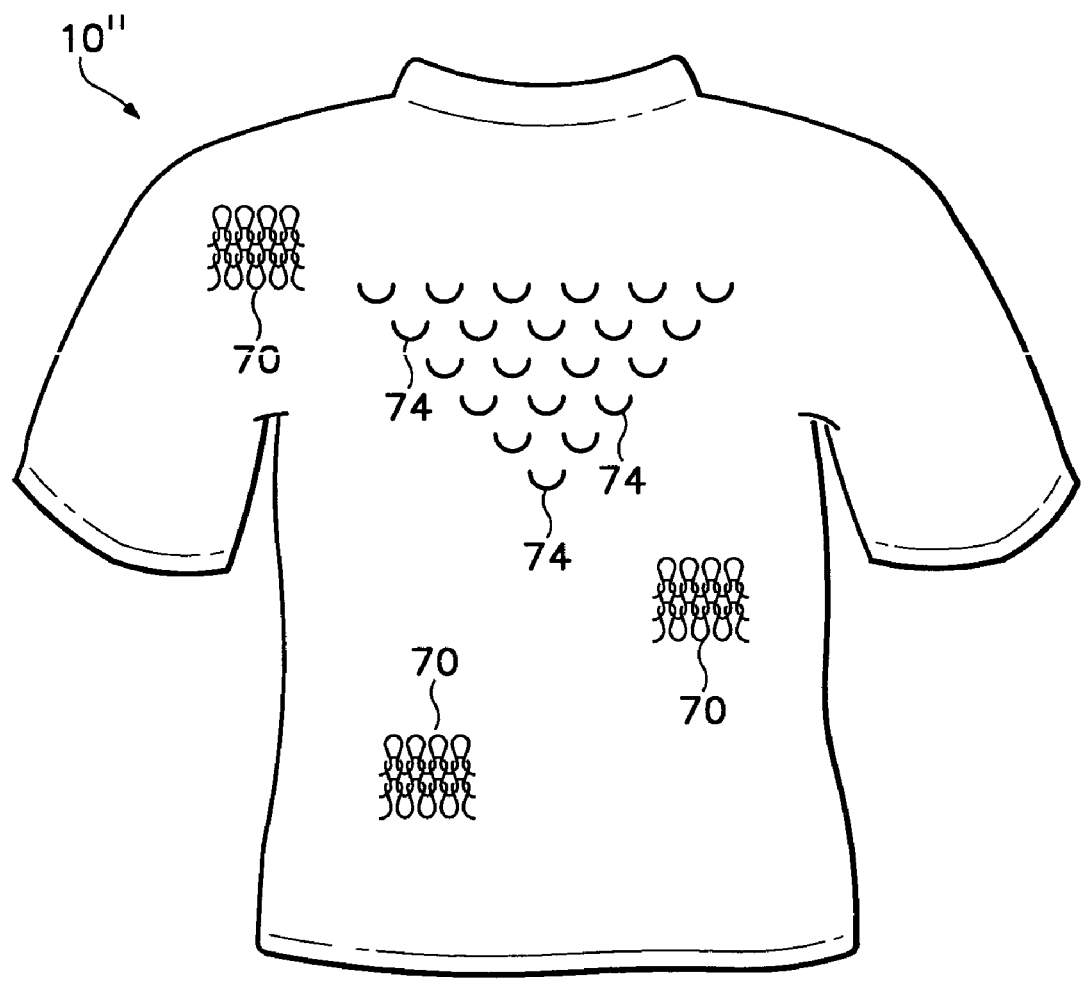
FIG. 25 is a plan view of an article of apparel incorporating a second altered textile structure in accordance with the present invention.
Figure 26:
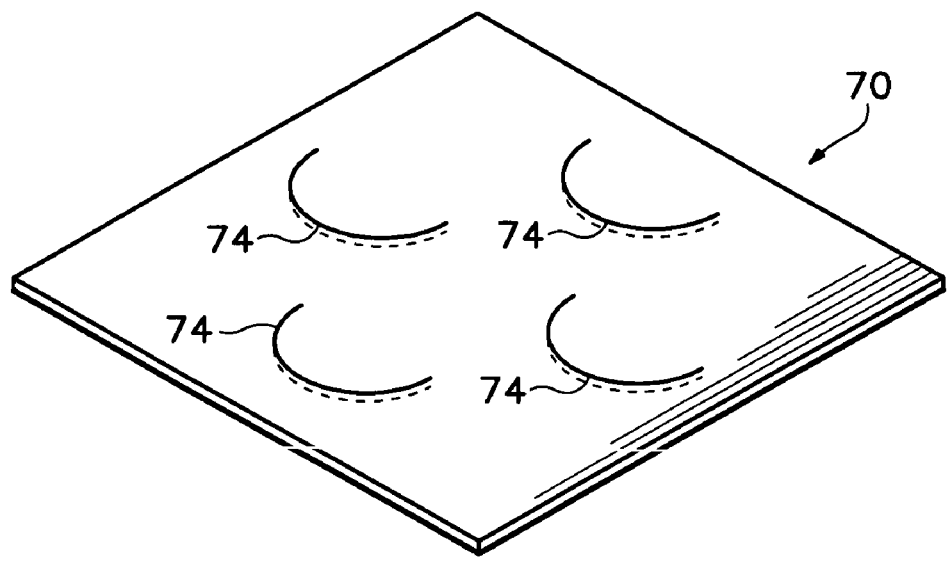
FIG. 26 is a perspective view of a portion of the second altered textile structure in an unexposed state.
Figure 27:
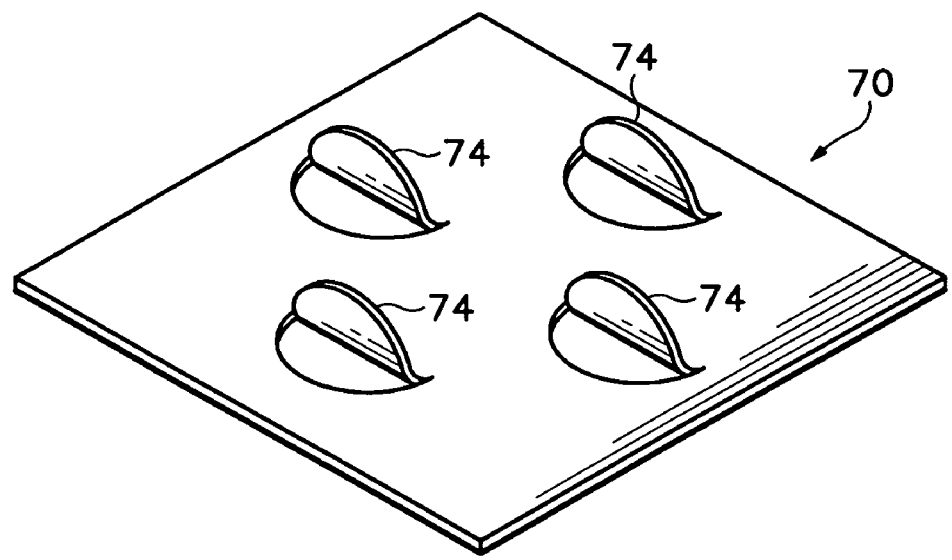
FIG. 27 is a perspective view of the portion of the second altered textile structure in an exposed state.

Another manner of altering any of the textile structures disclosed above relates to the formation of incisions. FIG. 25 depicts an article of apparel 10" that is substantially formed from textile 70, as disclosed above. A plurality of semi-circular incisions 74 extend through textile 74 and, therefore, extend through each of yarns 71 and 72. With reference to FIG. 26, a portion of textile 70 having incisions 74 is depicted in an unexposed state, in which yarns 71 and 72 are not exposed to the physical stimulus. With reference to FIG. 27, however, textile 70 is depicted in an exposed state, in which yarns 71 and 72 are exposed to the physical stimulus. In the unexposed state, textile 70 lies relatively flat and a flap that is formed by incisions 74 is in a closed configuration. In the exposed state, however, the flaps that are formed by incisions 74 curl upward and form apertures in textile 70, thereby modifying the structure and properties of textile 70.

The alteration in the structure of textile 70 (i.e., the formation of incisions 74) changes the properties of textile 70. In the unexposed state, textile 70 lies flat and incisions 74 do not form apertures. In the exposed state, however, the flaps formed by incisions 74 curl upward to form apertures in textile 70, which permit increased air flow between the exterior and interior of apparel 10". Exposing textile 70 to a physical stimulus not only increases the texture of textile 70, as discussed above, but also increases the air flow properties of textile 70.

Textile 70 is structured such that yarn 71 is concentrated on one surface and yarn 72 is concentrated on an opposite surface. When exposed to the physical stimulus, such as water or a change in temperature, for example, yarn 71 transforms dimensionally and increases in size. The increase in the size of textile 70 due to an increase in the size of yarn 71 is constrained by the relative dimensional-stability of yarn 72. Accordingly, the swelling of yarn 71 causes the flaps formed by incisions 74 to curl upward and toward the surface where yarn 72 is concentrated. Textile 70 is not the only textile structure that will react in this fashion when exposed to a physical stimulus. Each of textiles 80 and 90 may also exhibit similar properties due to the concentration of materials that transform dimensionally on one surface, and the concentration of dimensionally-stable materials on an opposite surface.

Figure 28A:
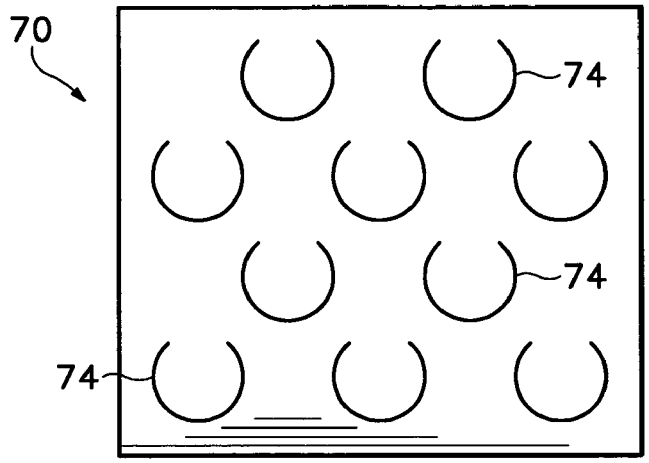
FIGS. 28A-28E are plan views of alternate configurations of the second altered textile structure.
Figure 28B:
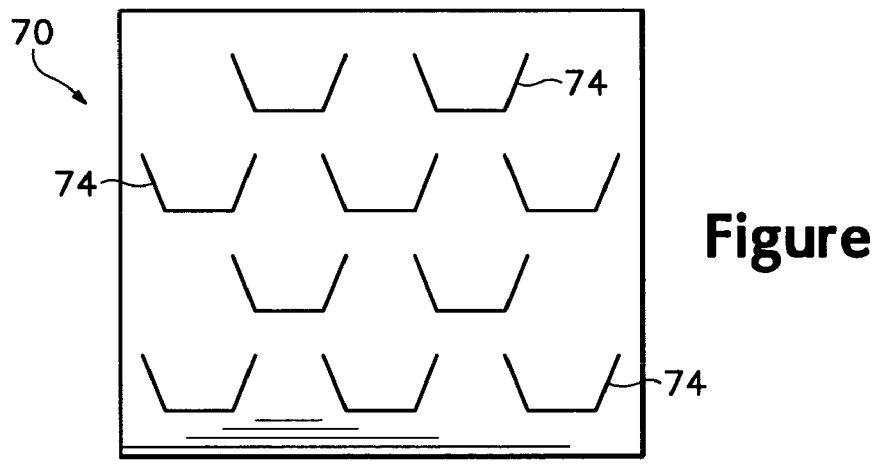
Figure 28C:
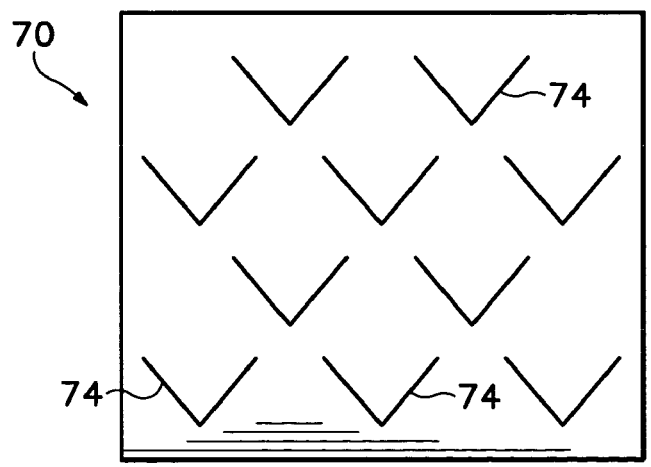
Figure 28D:
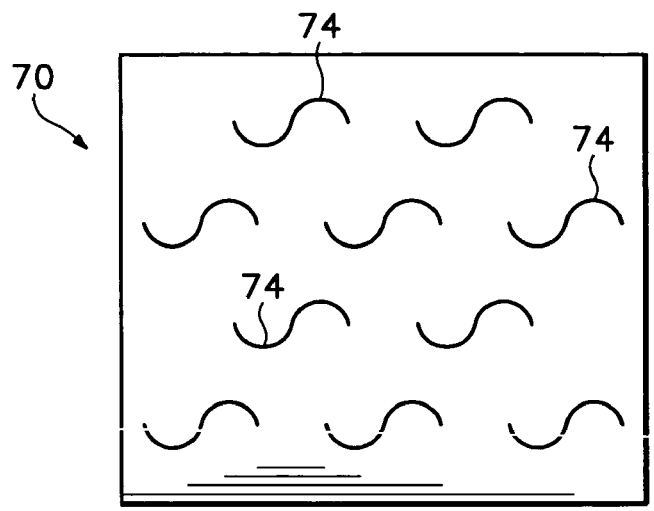
Figure 28E:
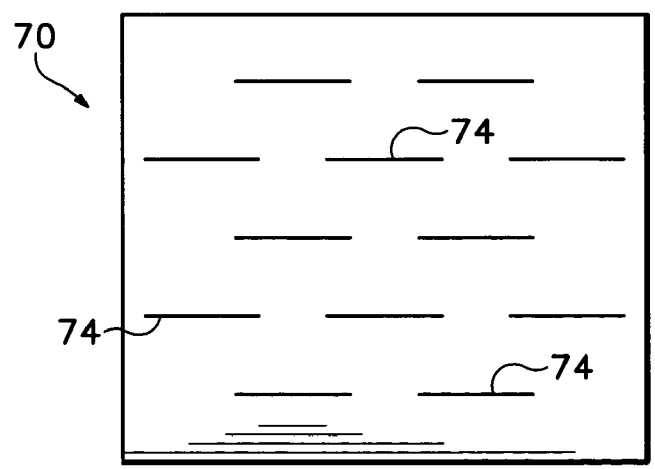

Although incisions 74 may exhibit the semi-circular shape discussed above, a variety of other shapes may also be suitable for incisions 74. For example, incisions 74 may have a more circular shape or an angular shape, as respectively depicted in FIGS. 28A and 28B. Incisions 74 may also exhibit a v-shaped or s-shaped configuration, as respectively depicted in FIGS. 24A and 24D. In some embodiments, incisions 74 may depart from the non-linear shapes discussed above and be linear, as depicted in FIG. 28E.

Various techniques, including a die cutting or laser cutting operation, may be utilized to form incisions 74. In some circumstances, incisions 74 may be formed through the knitting process of textile 70. That is, yarns 71 and 72 may be mechanically-manipulated in a manner that forms incisions 74.

Third Altered Textile Structure

Each of textiles 70, 80, and 90 exhibit a configuration wherein the material that transforms dimensionally when exposed to a physical stimulus is concentrated on one surface of the textile structures. Incisions that are similar to incisions 74 may be formed in any of the textile structures disclosed above. When cut to form incisions 74, textile 70 remains in a flat configuration until exposed to a physical stimulus. Some textile structures, however, may curl when cut and not exposed to a physical stimulus.

Figure 29:
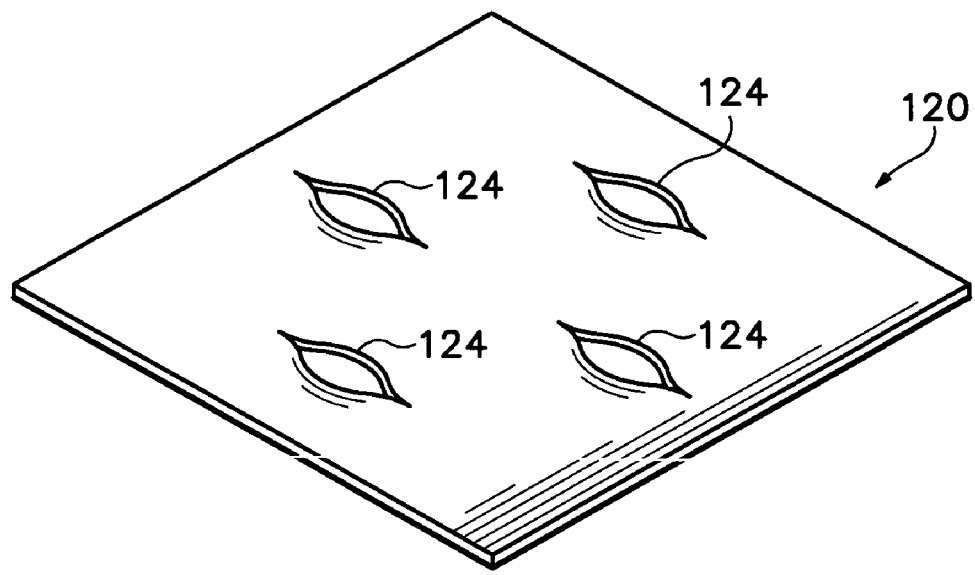
FIG. 29 is a perspective view of a portion of a third altered textile structure in an unexposed state.
Figure 30:
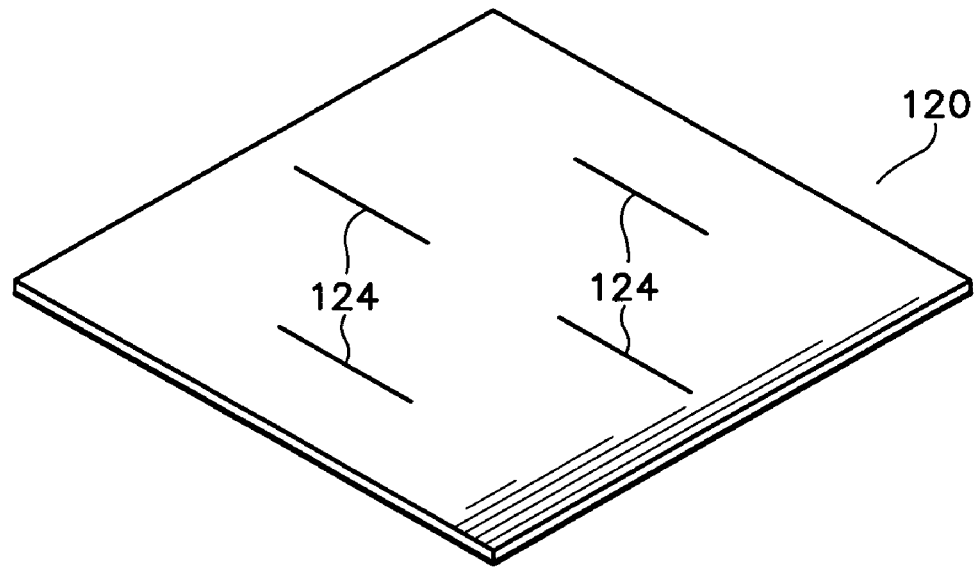
FIG. 30 is a perspective view of the portion of the third altered textile structure in an exposed state.

With reference to FIG. 29 a textile 120 in an unexposed state is depicted. Textile 120 includes a plurality of incisions 124. The manner in which textile 120 is mechanically-manipulated from various yarns, and the materials forming the yarns, are selected to cause the edges of incisions 124 to curl when cut and unexposed to a physical stimulus. When exposed to a physical stimulus, however, the edges uncurl due to the dimensional transformation of yarns, as depicted in FIG. 30. That is, apertures that are formed by incisions 124 close when exposed to a physical stimulus.

When incorporated into apparel, for example, textile 120 may be utilized to shield an individual from precipitation. When water is not present, incisions 124 form apertures in the apparel that facilitate air flow between the interior and exterior of the apparel. In the presence of precipitation, however, the apertures formed by incisions 124 close to limit the degree to which the precipitation may enter the apparel. Accordingly, the apparel may adapt to changing environmental conditions.

Fourth Altered Textile Structure

Figure 31:
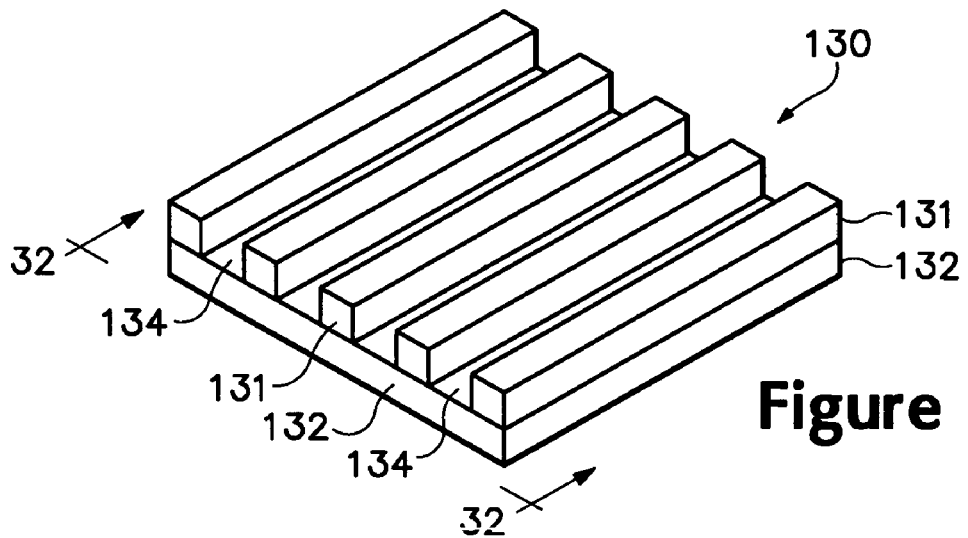
FIG. 31 is a perspective view of a portion of a fourth altered textile structure.
Figure 32A:
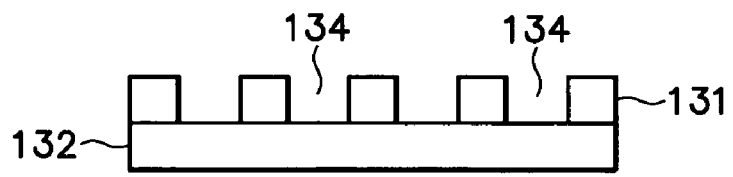
FIGS. 32A-32C are schematic cross-sectional views of the fourth altered textile structure, as defined along section line 32-32 in FIG. 31.

Incisions 74 and 124 respectively extend entirely through textiles 70 and 120. In some circumstances, however, incisions that extend only partially through a textile structure may be beneficial. FIG. 31 depicts a textile 130 that includes a plurality of partial incisions 134 that extend only partially through textile 130. With reference to FIG. 32A, textile 130 is depicted schematically as including a layer 131 and another layer 132, with partial incisions 134 extending through layer 131. Layer 131 and layer 132 schematically-represent the general configurations of textiles 70, 80, and 90, wherein materials that transform dimensionally in the presence of a physical stimulus are concentrated adjacent one surface, and materials that are dimensionally-stable are concentrated adjacent an opposite surface.

Partial incisions 134 extend entirely through layer 131 in FIG. 32A, and layer 131 is, therefore, absent from this area. Layer 131 may incorporate, for example, a majority of the materials that transform dimensionally in the presence of a physical stimulus. Forming partial incisions 134 effectively deactivates these materials. Accordingly, the formation of partial incisions 134 is a manner of preventing or limiting a change in the properties of specific areas of textile 130 due to the presence of a physical stimulus. Although partial incisions 134 are depicted as having a linear structure, partial incisions 134 may cover an area of textile 130.

Figure 32B:
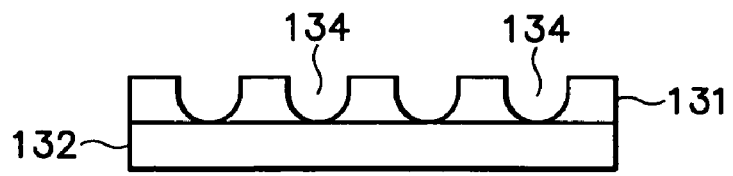
Figure 32C:
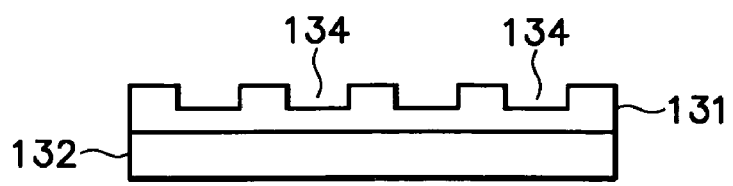

Although partial incisions 134 may represent areas where layer 131 is absent, partial incisions 134 may also form areas where layer 131 is melted or only partially absent. With reference to FIGS. 32B and 32C, partial incisions 134 form depressions in layer 131. One manner of forming the depressions is to melt the material of layer 131, thereby concentrating this material in a lower area of layer 131. In effect, therefore, partial incisions 134 may represent melted areas of layer 131. Although the material that is melted and within partial incisions 134 may be the same material that transforms dimensionally in the presence of a physical stimulus, the greater concentration of the material in partial incisions 134 may limit the change in the properties of textile 130 when exposed to the physical stimulus. That is, melting portions of layer 131 may effectively deactivate the material that transforms dimensionally in the presence of a physical stimulus. Suitable methods of forming partial incisions 134 include laser cutting or heated dies, for example.

Although partial incisions 134 may extend into the material that transforms dimensionally in the presence of a physical stimulus, partial incisions 134 may also extend into a dimensionally-stable material. That is, partial incisions 134 may extend through layer 132 rather than layer 131. In some embodiments, partial incisions may extend partially through a material that includes a single layer, as in textiles 20, 30, and 40, for example.

The melting of the material forming either of layers 131 or 132 in order to form partial incisions 134 may also be used to form a structure that is similar to reinforcing structure 112. As discussed above, reinforcing structure 112 may impart stretch resistance or abrasion resistance to a textile. By melting portions of layers 131 or 132, the materials forming layers 131 and 132 effectively concentrate and may also impart stretch resistance or abrasion resistance to textile 130. Accordingly, the formation of partial incisions 134 is another manner of forming reinforcing structure 112.

Fifth Altered Textile Structure

Figure 33:
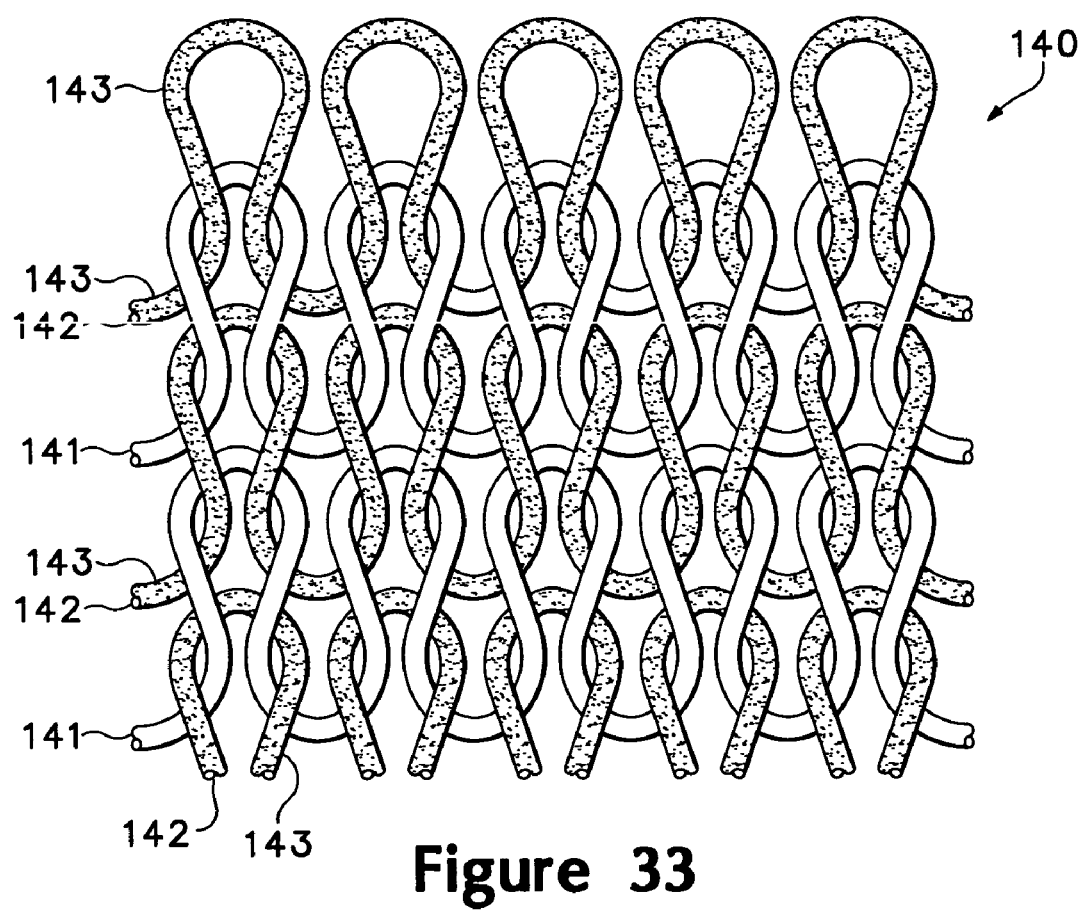
FIG. 33 is a plan view of a portion of a fifth altered textile structure.
Figure 34:
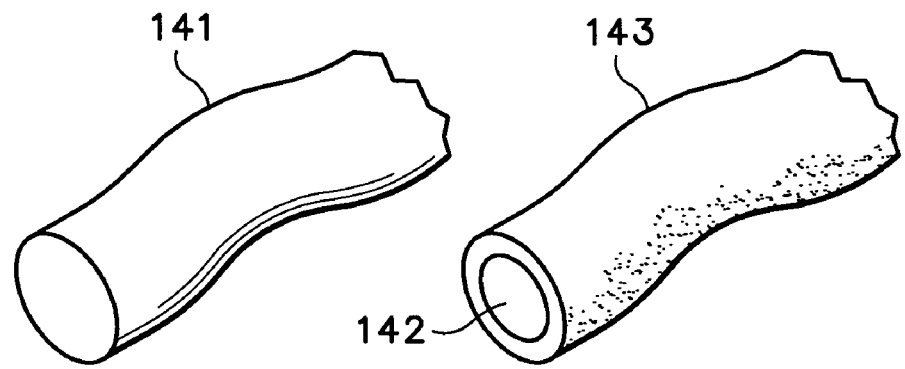
FIG. 34 is a schematic perspective view of a coated yarn and an uncoated yarn, each being in an unexposed state, from the fifth altered textile structure.
Figure 35:
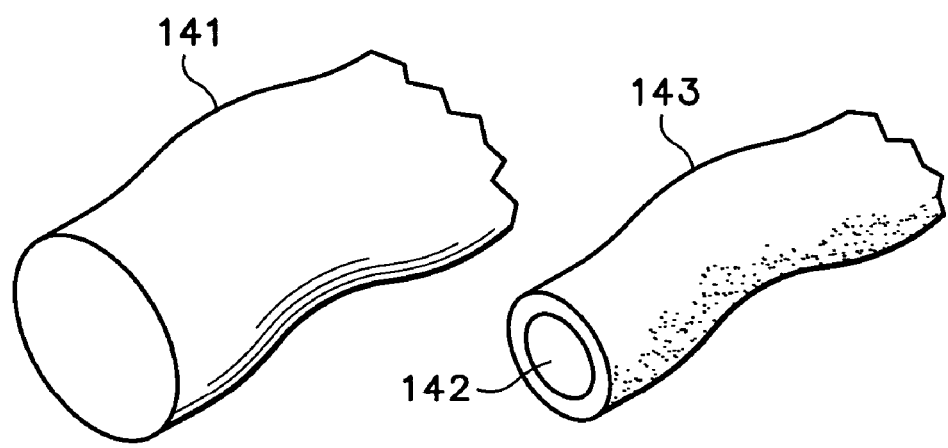
FIG. 35 is a schematic perspective view of the coated yarn and the uncoated yarn, each being in an exposed state, from the fifth altered textile structure.

The formation of partial incisions in a textile is one manner of blocking or deactivating the dimensional transformation of the textile in the presence of a physical stimulus. Coatings on the fibers, filaments, or yarns may also be utilized to block a physical stimulus from inducing dimensional transformation of the material. With reference to FIG. 33, a textile 140 that includes a yarn 141 and a yarn 142 is disclosed. Yarn 141 and yarn 142 are formed from a material that transforms dimensionally in the presence of a physical stimulus. In contrast with yarn 141, however, yarn 142 includes a coating 143 that blocks the physical stimulus from yarn 142. FIG. 34 depicts yarns 141 and 142 in an unexposed state, and yarns 141 and 142 have similar diameters. FIG. 35 depicts yarns 141 and 142 in the exposed state, and the overall diameter of yarn 141 is significantly greater than the diameter of yarn 142. Accordingly, exposing textile 140 to the physical stimulus induces yarn 141 to transform dimensionally, but coating 143 prevents or otherwise limits the dimensional transformation of yarn 142.

A variety of materials may be suitable for coating 143. If, for example, the material forming yarns 141 and 142 transform dimensionally in the presence of water, any waterproof coating may be utilized. If the physical stimulus is light or heat, opaque or insulative coatings may be utilized. Coating 143 may be added to yarn 142 prior to forming textile 140. An advantage of this procedure is that specific yarns within textile 140 include coating 143. In other embodiments, coating 143 may be added to textile 140 following the formation of textile 140. That is, a printing process (e.g., a screen-printing process) may be utilized to place coating 143 over a defined area of textile 140. In contrast with the configuration depicted in FIG. 33, the use of a printing process applies coating 143 to areas of textile 140, rather than individual yarns within textile 140.

Summary of Altered Textile Structures

Reinforcing structures, incisions, partial incisions, and coatings may be utilized to alter and enhance any of the textile structures disclosed above. Various combination of the reinforcing structures, incisions, partial incisions, and coatings may also be utilized to alter and enhance any of the textile structures disclosed above. For example, incisions or partial incisions may be formed in the apertures defined by a reinforcing structure. In addition, coatings may be utilized to affect the reaction of the areas having incisions.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A textile comprising:
   a first textile layer formed from a material that is substantially dimensionally-stable upon exposure to water, the first textile layer defining substantially all of a first surface of the textile; and
   a second textile layer positioned adjacent to the first textile layer and formed from filaments of (a) a moisture-absorptive polyester material that exhibits a dimensional transformation upon absorbing the water and (b) a non-absorptive polyester material that is substantially dimensionally-stable upon exposure to the water,
   wherein areas of the second textile layer are absent to expose corresponding areas of the first textile layer, both the first textile layer and the second textile layer defining a second surface of the textile, the second surface being opposite the first surface.

2. The textile recited in claim 1, wherein a plurality of incisions are formed through the textile, the incisions extending from the first surface to the second surface.

3. The textile recited in claim 2, wherein at least a portion of the incisions are non-linear.

4. The textile recited in claim 1, wherein the textile is a non-woven textile.

5. The textile recited in claim 1, wherein the textile is incorporated into an article of apparel.

* * * * *